United States Patent
Brownell et al.

(10) Patent No.: US 10,184,488 B2
(45) Date of Patent: Jan. 22, 2019

(54) FAN HOUSING HAVING FLUSH MOUNTED STATOR BLADES

(71) Applicant: Greenheck Fan Corporation, Schofield, WI (US)

(72) Inventors: Kyle Andrew Brownell, Schofield, WI (US); Shamus William Doran, Mosinee, WI (US); Jared Clyde Wesenick, Wausau, WI (US); Kenneth Dean Tucker, Ringle, WI (US)

(73) Assignee: Greenheck Fan Corporation, Scholfield, WI (US)

( * ) Notice: Subject to any disclaimer, the term of this patent is extended or adjusted under 35 U.S.C. 154(b) by 467 days.

(21) Appl. No.: 13/776,135

(22) Filed: Feb. 25, 2013

(65) Prior Publication Data

US 2014/0241868 A1    Aug. 28, 2014

(51) Int. Cl.
    *F04D 29/54*    (2006.01)
    *F04D 29/42*    (2006.01)
    (Continued)

(52) U.S. Cl.
    CPC ............ *F04D 29/544* (2013.01); *B23P 15/02* (2013.01); *F01D 9/00* (2013.01); *F04D 25/0693* (2013.01);
    (Continued)

(58) Field of Classification Search
    CPC .. F04D 29/542; F04D 29/544; F04D 29/4266; F04D 29/44; F04D 29/52;
    (Continued)

(56) References Cited

U.S. PATENT DOCUMENTS 2,022,417 A    11/1935    Gilbert et al.
2,054,144 A     9/1936    Swigert
(Continued)

FOREIGN PATENT DOCUMENTS

CA    566698 A    11/1958
CA    2777140 A1   4/2011
(Continued)

OTHER PUBLICATIONS translateCN1748933, machine translation of CN 1748933, espacenet.com, Sep. 29, 2017, pp. 1-16.*
(Continued)

*Primary Examiner* — Bryan Lettman
*Assistant Examiner* — Timothy P Solak
(74) *Attorney, Agent, or Firm* — Merchant & Gould P.C.

(57) ABSTRACT

Fan assemblies, and in particular fan wheels and stator assemblies for fan assemblies, are disclosed. In one embodiment, the fan wheel includes a wheel back having an outer surface forming one of a curved dome-shape and a truncated cone-shape. The fan wheel may also include a plurality of fan blades radially spaced about and mounted to the outer surface of the wheel back. In one embodiment, each of the fan blades is formed from a segment of an airfoil-shaped aluminum extrusion defining at least one internal cavity. The fan blade first ends can be provided with a compound cut profile with at least one curved cut such that the first end of the blade is mounted flush to the wheel back outer surface. The stator assembly can also be provided with a plurality of stator blades formed from airfoil-shaped aluminum extrusion segments and provided with compound cut profiles.

5 Claims, 33 Drawing Sheets

(51) Int. Cl.

| | | |
|---|---|---|
| F04D 29/44 | (2006.01) | |
| F04D 25/08 | (2006.01) | |
| F04D 29/52 | (2006.01) | |
| F04D 29/02 | (2006.01) | |
| F01D 9/00 | (2006.01) | |
| B23P 15/02 | (2006.01) | |
| F04D 25/06 | (2006.01) | |

(52) U.S. Cl.
CPC ........... *F04D 25/08* (2013.01); *F04D 29/023* (2013.01); *F04D 29/4266* (2013.01); *F04D 29/444* (2013.01); *F04D 29/52* (2013.01); *F04D 29/542* (2013.01); *F05D 2230/232* (2013.01); *F05D 2230/24* (2013.01); *F05D 2230/26* (2013.01); *F05D 2300/121* (2013.01); *Y10T 29/49327* (2015.01)

(58) Field of Classification Search
CPC ........... F04D 25/0693; F05D 2240/125; F05D 2230/24; F05D 2300/121; F05D 2230/26; B23P 15/02; Y10T 29/49327; B22D 11/009; F01D 9/00
See application file for complete search history.

(56) References Cited

U.S. PATENT DOCUMENTS

| | | | |
|---|---|---|---|
| 2,434,896 A | | 1/1948 | Ayers |
| 2,855,141 A | * | 10/1958 | Van Rijn .................. 417/423.14 |
| 3,069,071 A | | 12/1962 | Carlson |
| 3,101,890 A | | 8/1963 | Carlson |
| 3,102,679 A | * | 9/1963 | Emil ..................... F04D 17/165 415/207 |
| 3,140,042 A | | 7/1964 | Noriyoshi |
| 3,237,850 A | * | 3/1966 | Troller .................. F04D 29/681 415/115 |
| 3,300,123 A | * | 1/1967 | Helmut .................. B21D 53/78 29/889.7 |
| 3,312,386 A | | 4/1967 | Hull |
| 3,412,928 A | * | 11/1968 | Hull et al. ................. 415/214.1 |
| 3,515,498 A | | 6/1970 | Tomita |
| 3,551,070 A | | 12/1970 | Glucksman |
| 3,561,883 A | | 2/1971 | Berry |
| 3,584,968 A | | 6/1971 | Keith |
| 3,650,633 A | | 3/1972 | Benoit |
| 3,969,805 A | * | 7/1976 | Lievens ................ B23P 15/006 29/446 |
| 3,976,393 A | * | 8/1976 | Larson .................. F04D 29/646 415/119 |
| 4,092,088 A | | 5/1978 | Nemesi |
| 4,278,617 A | | 7/1981 | Rahman |
| 4,618,315 A | | 10/1986 | Papst et al. |
| 4,636,669 A | * | 1/1987 | Plunkett et al. ................. 310/51 |
| 4,662,819 A | | 5/1987 | Lakowske et al. |
| 4,704,066 A | * | 11/1987 | Weissbacher ................ 415/191 |
| 5,127,801 A | | 7/1992 | Mortensen |
| 5,197,191 A | * | 3/1993 | Dunkman ............... B23P 6/002 29/402.19 |
| 5,209,639 A | | 5/1993 | Neuber et al. |
| 5,273,400 A | | 11/1993 | Amr |
| 5,454,691 A | * | 10/1995 | Henri ..................... B64C 27/82 244/17.19 |
| 5,511,942 A | * | 4/1996 | Meier ................... F04D 29/542 415/211.2 |
| 5,810,557 A | | 9/1998 | Akinkuotu et al. |
| 6,042,333 A | | 3/2000 | Day |
| 6,471,473 B1 | | 10/2002 | Wilkinson et al. |
| 6,508,627 B2 | * | 1/2003 | Gerken et al. ............ 416/186 R |
| 6,527,511 B1 | | 3/2003 | Wu |
| 6,945,758 B1 | | 9/2005 | Lievens |
| 7,048,499 B2 | | 5/2006 | Mathson et al. |
| 7,682,231 B2 | | 3/2010 | Enzenroth |
| 8,007,240 B2 | | 8/2011 | Sanagi et al. |
| 8,052,386 B1 | | 11/2011 | Fitzpatrick et al. |
| 8,205,334 B2 | * | 6/2012 | Leibfried ................ B23P 6/002 29/402.06 |
| D665,895 S | | 8/2012 | Rasmussen |
| 8,313,299 B2 | | 11/2012 | Kapferberg |
| D683,840 S | | 6/2013 | Rasmussen |
| D692,119 S | | 10/2013 | Rasmussen |
| D704,323 S | | 5/2014 | Rasmussen |
| 9,505,092 B2 | | 11/2016 | Brownell et al. |
| 2002/0131863 A1 | | 9/2002 | Cheng |
| 2002/0180279 A1 | | 12/2002 | Gerken et al. |
| 2003/0077175 A1 | | 4/2003 | Marlander et al. |
| 2003/0185673 A1 | | 10/2003 | Matsumoto et al. |
| 2003/0206800 A1 | * | 11/2003 | Mathson ................ F04D 17/06 415/220 |
| 2004/0126233 A1 | | 7/2004 | Wang |
| 2004/0131470 A1 | | 7/2004 | Boyd |
| 2005/0199766 A1 | * | 9/2005 | Knott .................... B64C 21/025 244/55 |
| 2008/0008596 A1 | | 1/2008 | Aynsley |
| 2008/0085188 A1 | | 4/2008 | Hanlon |
| 2008/0219836 A1 | * | 9/2008 | Decker ................ F04D 29/542 415/177 |
| 2010/0068028 A1 | * | 3/2010 | Bushnell ......................... 415/1 |
| 2010/0123039 A1 | * | 5/2010 | Buhl ...................... B64C 27/82 244/17.19 |
| 2011/0052397 A1 | | 3/2011 | Kusters et al. |
| 2012/0003098 A1 | * | 1/2012 | Lewis .................... B21C 23/16 416/223 R |
| 2012/0210572 A1 | | 8/2012 | Kampf |
| 2012/0219414 A1 | | 8/2012 | Kampf |
| 2012/0219416 A1 | | 8/2012 | Kampf |
| 2012/0243983 A1 | | 9/2012 | Breeze-Stringfellow et al. |
| 2013/0011239 A1 | | 1/2013 | Khalitov et al. |
| 2014/0237819 A1 | | 8/2014 | Brownell et al. |
| 2014/0241868 A1 | | 8/2014 | Brownell et al. |
| 2014/0241894 A1 | | 8/2014 | Brownell et al. |
| 2014/0241920 A1 | | 8/2014 | Brownell |

FOREIGN PATENT DOCUMENTS

| | | | | |
|---|---|---|---|---|
| CN | 1341813 A | | 3/2002 | |
| CN | 1443283 A | | 9/2003 | |
| CN | 1748933 | * | 3/2004 | ............. B23P 15/04 |
| CN | 1746513 A | | 3/2006 | |
| DE | 949 899 | | 9/1956 | |
| DE | 203 19 741 U1 | | 10/2004 | |
| DE | 10 2010 035 284 A1 | | 3/2012 | |
| JP | 56-83598 | | 7/1981 | |
| JP | 2000-117448 | | 4/2000 | |
| JP | 2002-303297 | | 10/2002 | |
| JP | 2011-32991 | | 2/2011 | |
| NZ | 329093 | | 9/1999 | |
| WO | WO 96/23140 | | 8/1996 | |
| WO | WO 02/097277 A1 | | 12/2002 | |
| WO | WO 2011/044908 | | 4/2011 | |
| WO | WO 2011/044909 | | 4/2011 | |
| WO | WO 2011/044910 | | 4/2011 | |
| WO | WO 2013/017577 | | 2/2013 | |
| WO | WO 2013/017584 | | 2/2013 | |

OTHER PUBLICATIONS

China Plasma Arc Welding Stainless Steel Welded Tube (ASTM A249)—large image for Welded Stainless Pipe, 2 pages (Copyright 2012).

Mannion, B., "Arc welding on a stainless steel tube mill," Pro-Fusion by Elderfield & Hall, 5 pages (Copyright 2010).

Novenco—ZerAx, http://www.novenco-marine.com/en/Products_and_systems/ZerAx.aspx, 1 page (Date printed Jul. 16, 2012).

Propeller Inline Catalog, Loren Cook Company, 30 pages (May 2005).

The Plasma Arc Welding Process, Pro-Fusion by Elderfield & Hall, 5 pages (Copyright 2003-2009).

International Search Report and Written Opinion for PCT/US2013/029395 dated Nov. 4, 2013.

(56) References Cited

OTHER PUBLICATIONS

Common Design Mistakes in Aluminum, https://web.archive.org/web/20110128195606/http://www.lincolnelectric.com/en-us/support/welding-how-to-/Pages/aluminum-design-mistakes-detail, 4 pages, (published 2011).

* cited by examiner

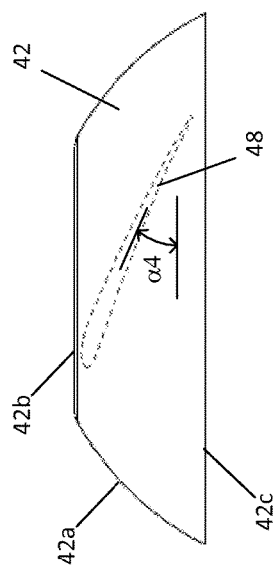
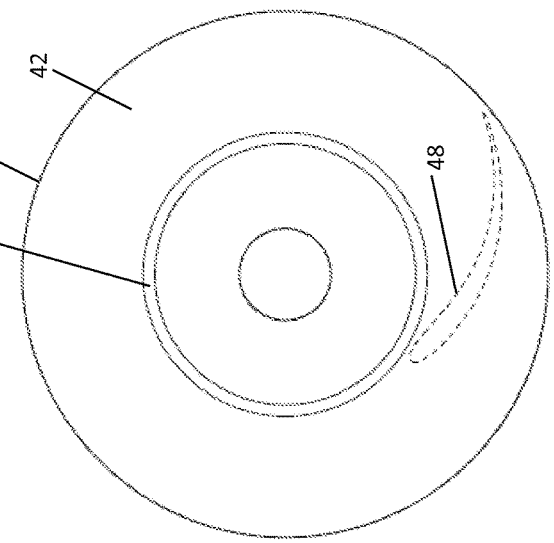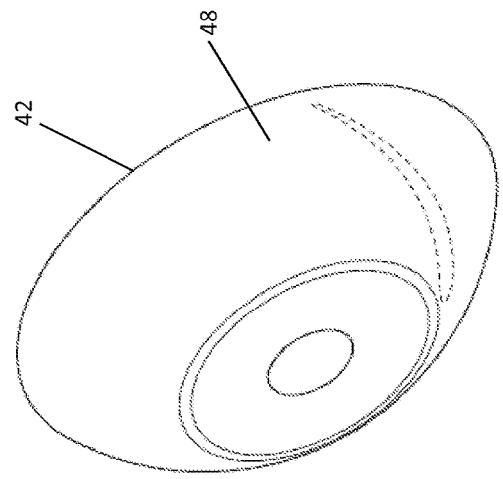

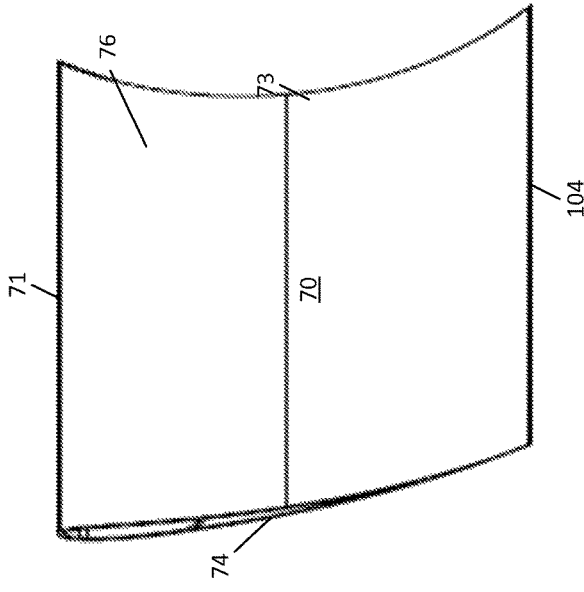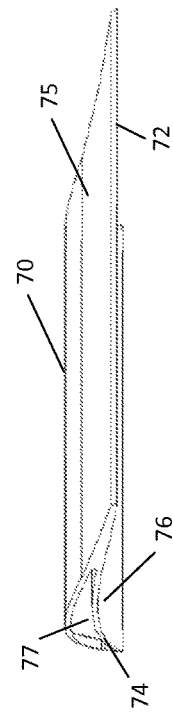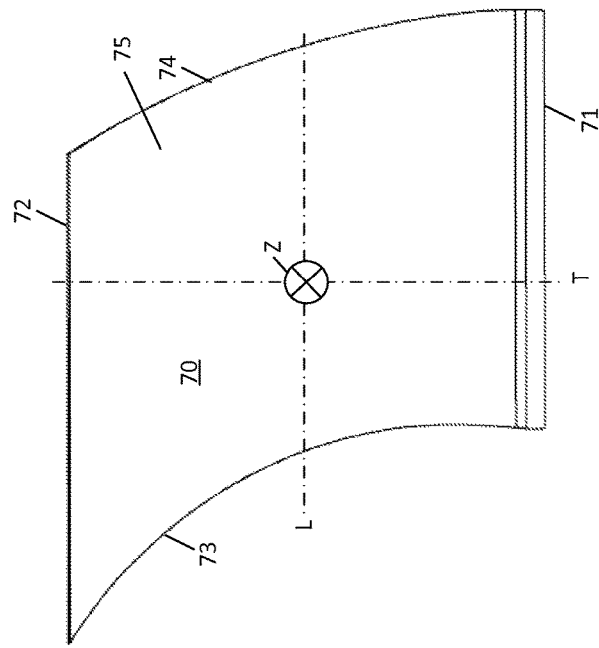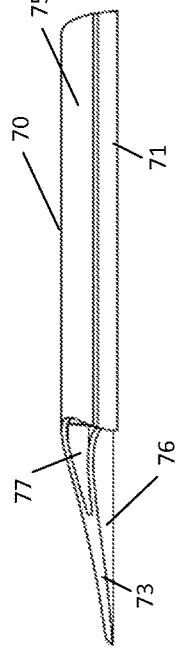
FIG. 11
FIG. 12
FIG. 13
FIG. 14

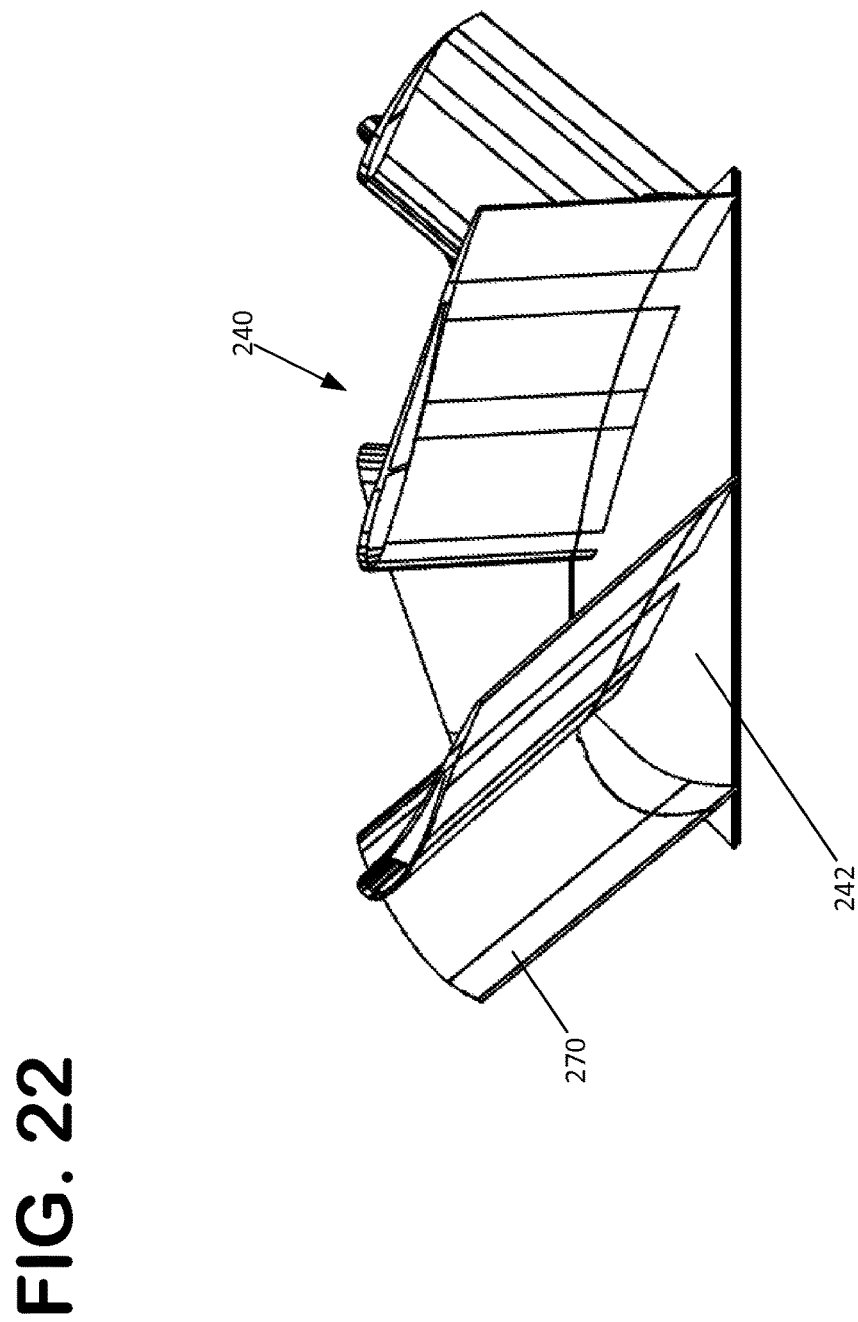

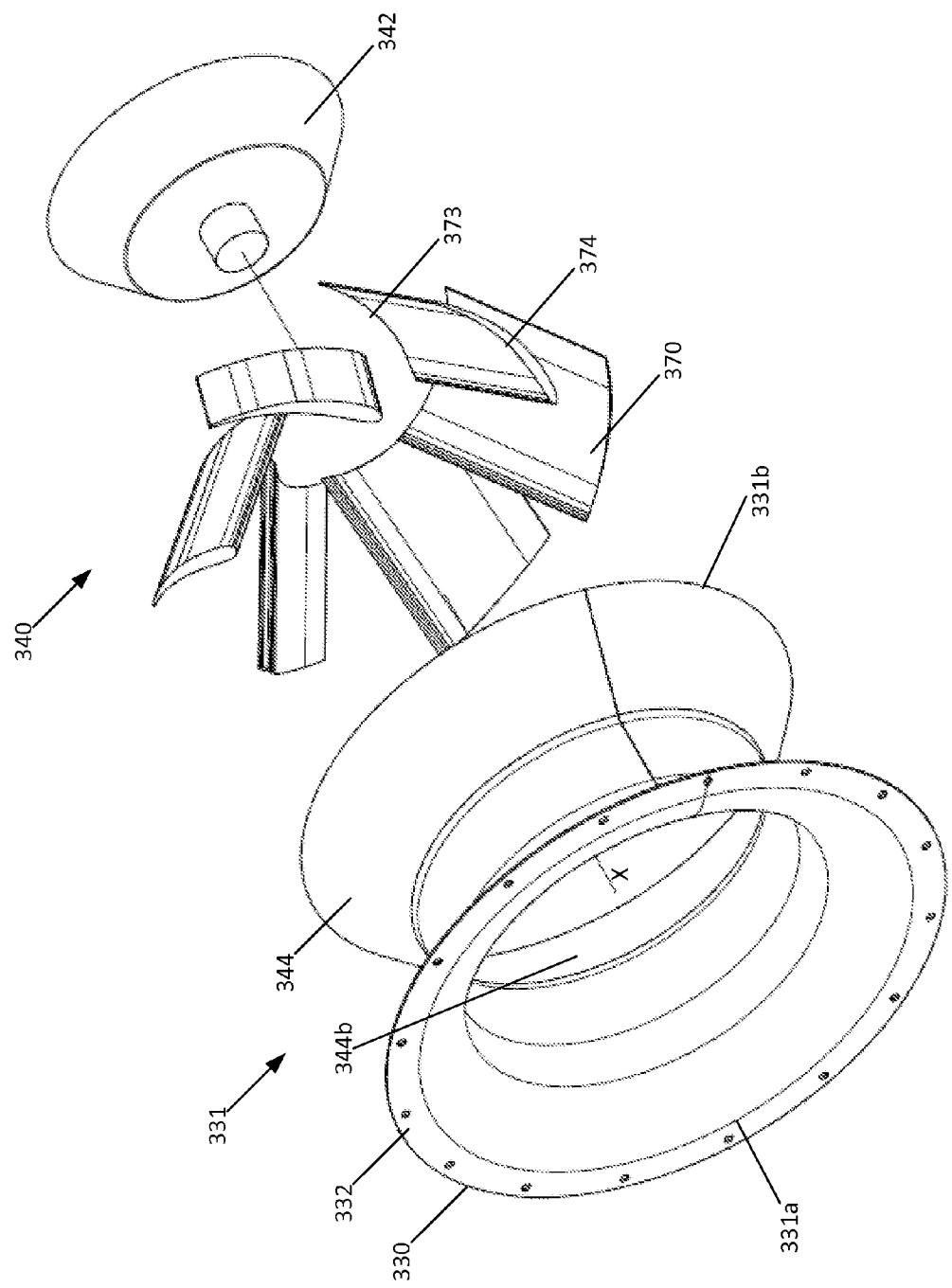

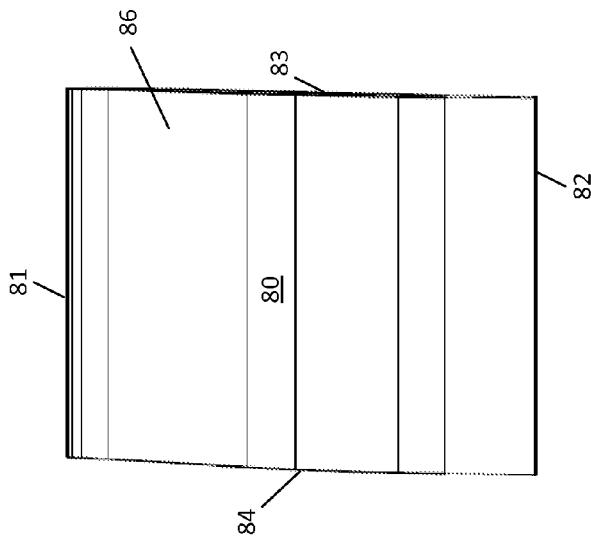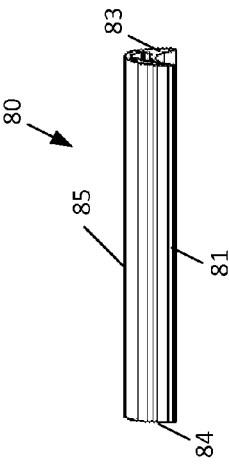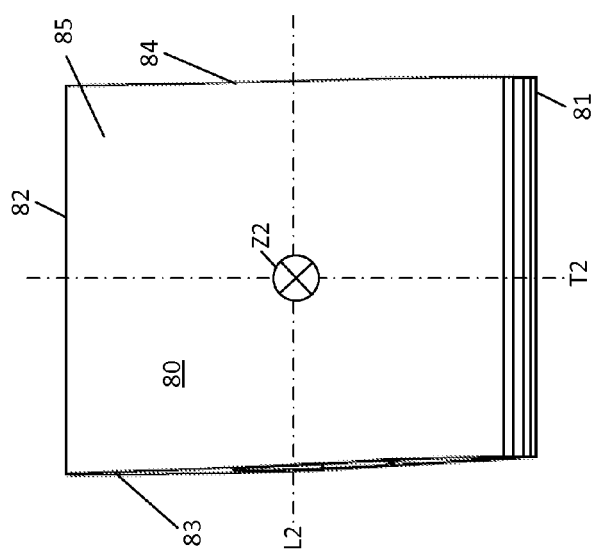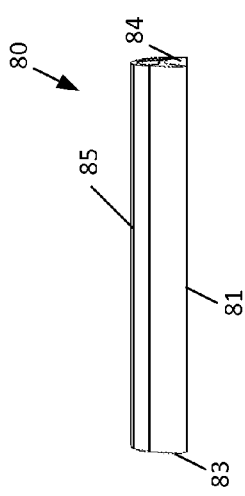

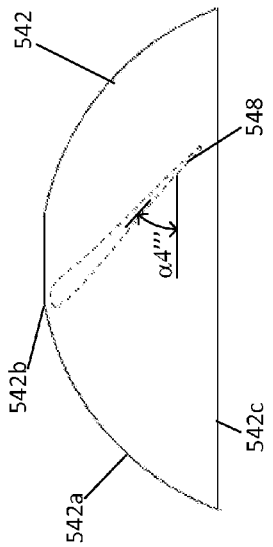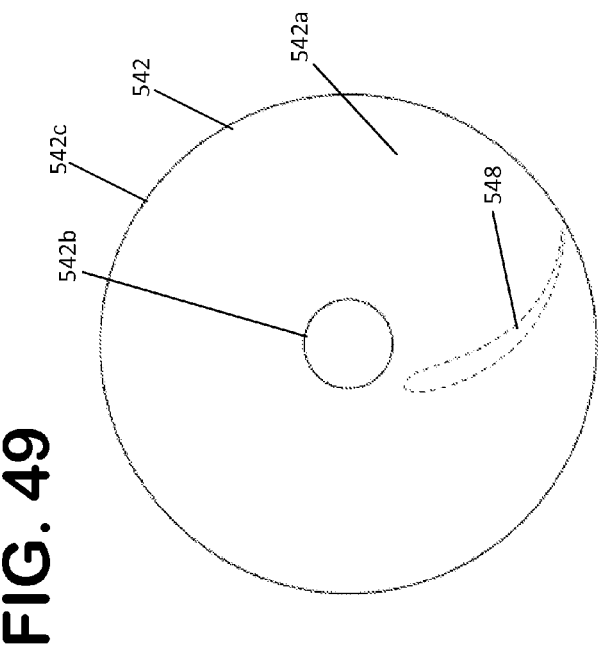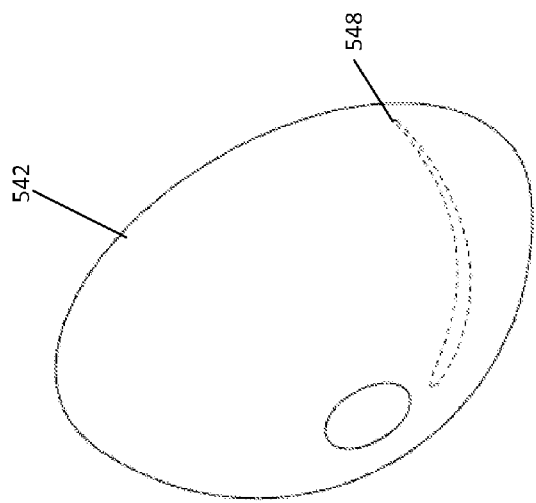
FIG. 47
FIG. 48
FIG. 49

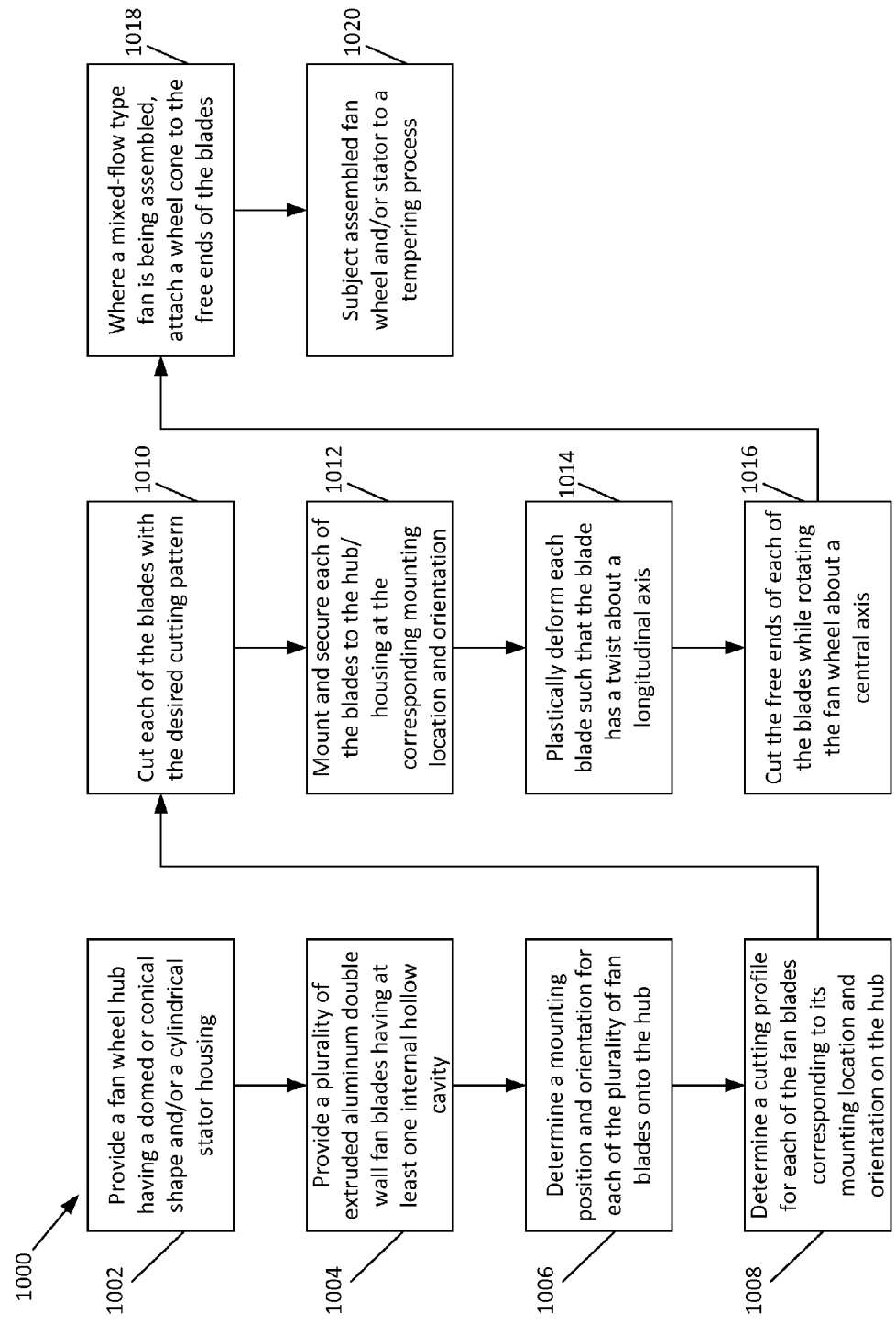

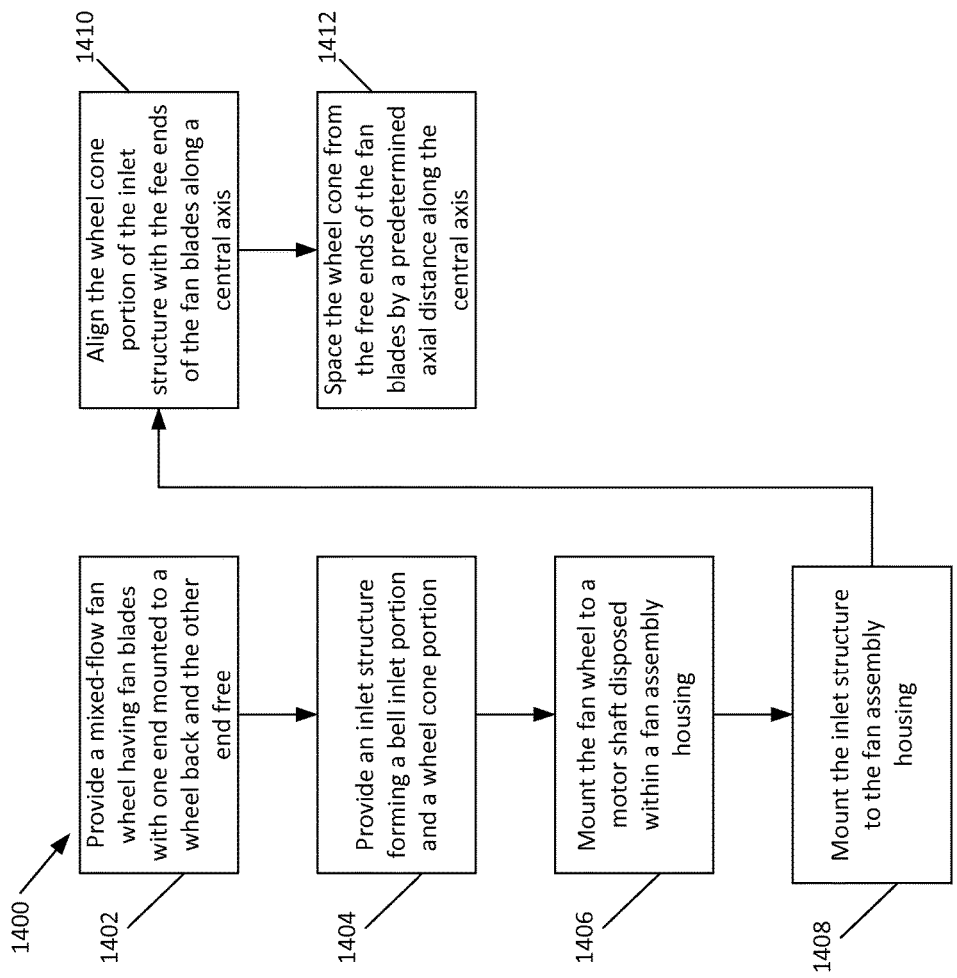

FAN HOUSING HAVING FLUSH MOUNTED STATOR BLADES

BACKGROUND

Fan assemblies for providing airflow are known. In some applications, fan assemblies include fan blades that are mounted to a central hub or wheel back and have ends that match the profile of the hub or wheel back. Where the fan blades are required to have a three-dimensional airfoil cross-sectional shape, the blades are often formed from laser or turret cut flat blank that has been formed and welded or a casting process and then later joined to the hub or wheel back. Improvements are desired.

SUMMARY

Fan assemblies for providing means for transporting air, such as through a ducting system for a building supply, exhaust, or return air system are disclosed. In one embodiment, the fan assembly includes a mixed-flow type fan wheel while in another embodiment the fan assembly includes an axial-flow type fan propeller. As shown and described herein, each of the fan assemblies include a generally cylindrical outer housing having an outer surface and an inner surface. A stator assembly may also be provided that serves to straighten airflow and to support an electric drive motor that is coupled to the fan wheel.

In one embodiment, the fan wheel includes a wheel back having an outer surface forming one of a curved dome-shape and a truncated cone-shape. The fan wheel may also include a plurality of fan blades radially spaced about and mounted to the outer surface of the wheel back. Each of the fan blades can be configured to have a first end mounted to the wheel back and can be oriented with respect to the wheel back to define an interface contour projection at the wheel back outer surface. In one embodiment, each of the fan blades is formed from a segment of an airfoil-shaped aluminum extrusion defining at least one internal cavity. The fan blade first ends can be provided with a compound cut profile with at least one curved cut line wherein the compound cut profile matches the first interface contour projection such that the first end of the blade is mounted flush to the wheel back outer surface.

In one embodiment the stator assembly includes a generally cylindrical inner housing having an outer surface and a motor support flange connected to the inner housing. The stator may be provided with a plurality of radially spaced stator blades extending from the inner housing to the inner surface of the fan assembly. The stator blades can be oriented such that air leaving the fan wheel is straightened to a certain extent within the housing before leaving the fan assembly. In one embodiment, each of the stator blades has a first end mounted to the inner housing outer surface and being oriented with respect to the inner housing to define an interface contour projection at the inner housing outer surface. Each of the stator blades is formed from a segment of an airfoil-shaped aluminum extrusion defining at least one internal cavity. The stator blade first end can be configured with a compound cut profile with at least one curved cut line such that the compound cut profile matches the second interface contour projection thereby allowing the first end of the stator blade is mounted flush to the inner housing outer surface.

Method for making fan assemblies, and in particular fan wheels and stator assemblies, are also disclosed.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 8 is a perspective view of a fan wheel back usable with the fan wheel shown in FIG. 2.

FIG. 9 is a side view of a fan wheel back usable with the fan wheel shown in FIG. 2.

FIG. 10 is a top view of a fan wheel back usable with the fan wheel shown in FIG. 2.

FIG. 11 is a top view of a fan blade usable with the fan wheel shown in FIG. 2.

FIG. 12 is a bottom view of the fan blade shown in FIG. 11.

FIG. 13 is a front view from the leading edge of the fan blade shown in FIG. 11.

FIG. 14 is a rear view from the trailing edge of the fan blade shown in FIG. 11.

FIG. 22 is a side view of the fan wheel shown in FIG. 20.

FIG. 26 is a perspective exploded view of a third embodiment of a mixed-flow fan wheel and combined wheel cone and inlet cone having features that are examples of aspects in accordance with the principles of the present disclosure.

FIG. 34 is a top view of a stator blade usable with the stator assembly shown in FIG. 30.

FIG. 35 is a bottom view of the stator blade shown in FIG. 34.

FIG. 36 is a front view from the leading edge of the stator blade shown in FIG. 34.

FIG. 37 is a rear view from the trailing edge of the stator blade shown in FIG. 34.

FIG. 47 is a front perspective view of a portion of the fan wheel shown in FIG. 41.

FIG. 48 is a side view of a portion of the fan wheel shown in FIG. 41.

FIG. 49 is a top view of a portion of the fan wheel shown in FIG. 41.

FIG. 57 is a flow chart showing a process for creating a fan wheel assembly.

FIG. 61 is a flow chart showing a process for creating a fan assembly having a mixed-flow fan with a separate wheel cone.

DETAILED DESCRIPTION

Figure 1:
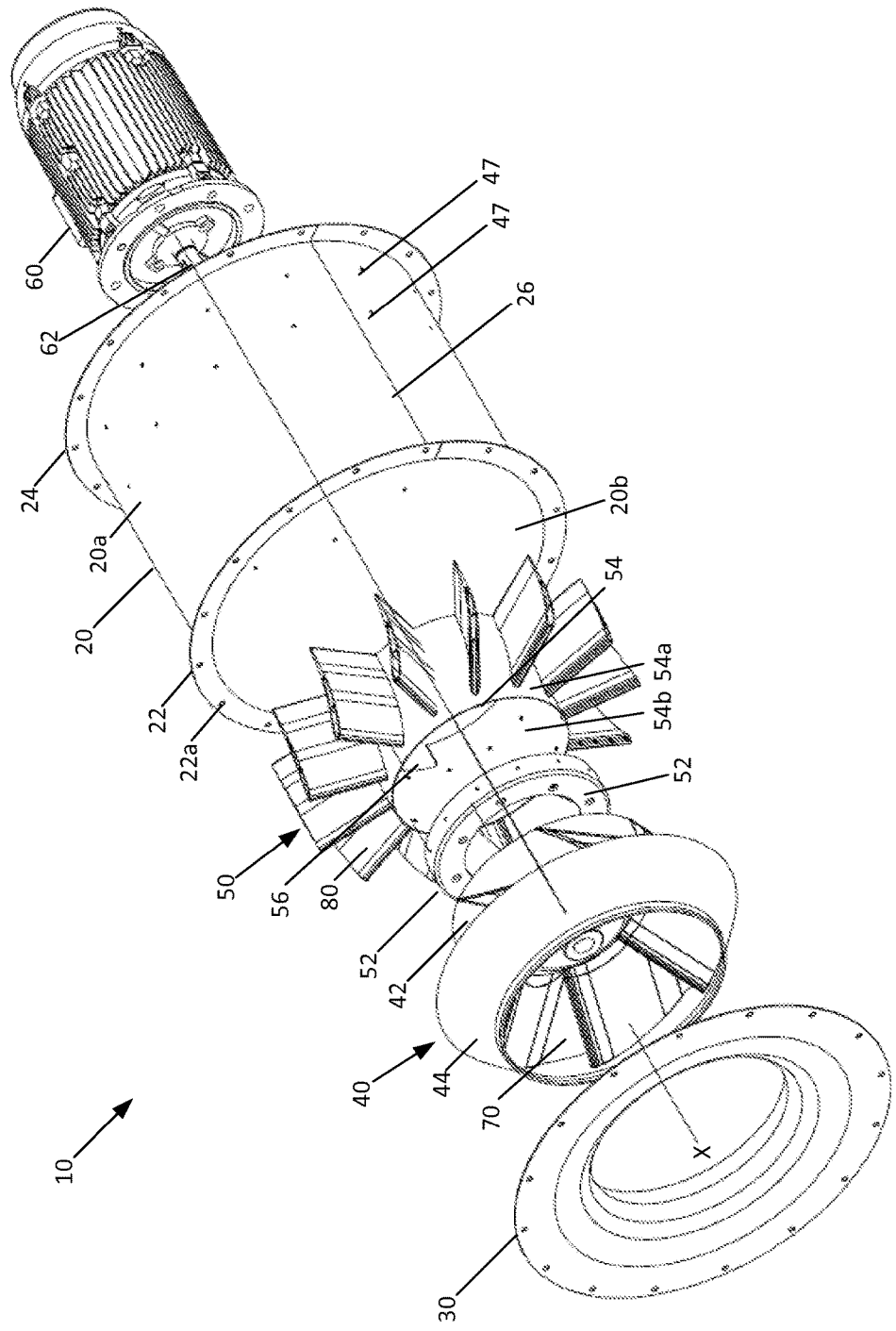
FIG. 1 is an exploded perspective view of a first embodiment of a fan assembly having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Mixed Flow Fan Assembly—General Description

Referring now to FIG. 1, an example fan assembly 10 is shown. Fan assembly 10 is for providing means for transporting air, such as through a ducting system (not shown) relating to a building heating, ventilation, and air conditioning system. As shown, fan assembly 10 includes a generally cylindrical outer housing 20 defining an outer surface 20a and an inner surface 20b. Housing 20 is also shown as being provided with a first flange 22 and a second flange 24. The first and second flanges 22, 24 are for allowing the fan assembly 10 to be connected to the ducting system or other equipment. Flange 22 is also shown as being configured to accept a bell inlet 30 which serves the purpose of guiding air into a fan wheel 40 of the fan assembly 10. In the embodiment shown, the housing 20 is formed by rolling and the ends of the sheet from which the housing 20 is formed joined together at a seam line 26. In one embodiment, the housing 20 ends are joined together at seam line 26 by a welding process, for example by plasma arc welding. Plasma arc welding of the seam line 26 is preferable because this type of welding can be performed such that it does not significantly damage the galvanized protective coating in the area of the weld. Additionally, this type of welding can be done to minimize the overall height of the weld which reduces or eliminates the need to grind on the outer tube prior to forming the flange on the welded tube. By minimizing the amount of galvanized coating that is damaged in the welding process, the tube can be manufactured with minimal or no additional post processing to protect the weld area using paint or other protective coatings.

The fan wheel 40 is mounted to and driven by an electric drive motor 60 via a shaft 62 provided on the motor 60. The fan wheel 40 may be provided with a center hub or coupling mechanism 46 to accept a keyed or splined motor shaft 62 such that rotation of the motor shaft 62 effectuates rotation of the fan wheel 40. As the fan wheel 40 rotates, air is directed from an inlet end 40a to an outlet end 40b.

As shown, the fan wheel 40 includes a plurality of airfoil-shaped radially disposed extruded fan blades 70. The fan blades 70 extend from an outer surface 42a of a base, such as a wheel back 42, to an inner surface 44b of a wheel cone 44 having the shape of a truncated cone. In operation, the fan blades 70 and the wheel cone 44 operates in conjunction to force or direct the generated airflow from the inlet end 40a of the fan wheel towards the outlet end 40b of the fan wheel. This type of configuration is conventionally known as a "mixed flow" type fan which shares characteristics of both centrifugal and axial type fans. As shown, fan wheel 40 is provided with six fan blades 70. However, it should be understood that more or fewer fan blades are possible, such as four or five fan blades or up to twelve fan blades. The fan wheel 40 and constituent components are discussed in further detail in later sections of this specification.

The fan assembly 10 is also shown as being provided with a stator assembly 50 which serves the purpose of supporting and housing the electric drive motor 60 via a support flange 52 and inner housing 54, respectively. As shown, the inner housing 54 is generally cylindrical and has an outer surface 54*a* and an inner surface 54*b*. In the embodiment shown, the inner housing 54 also has a notch 56 to allow for a portion of the motor 60, such as a junction box, to extend beyond the inner housing 54.

The stator assembly 50 also operates to straighten the airflow after the air has passed through the fan wheel 40. This is accomplished via a plurality of radially disposed airfoil-shaped extruded stator blades 80 extending from the outer surface 54*a* of the inner housing 54 to the inner surface 20*b* of the outer housing 20. The fan wheel is discussed in further detail in other parts of the specification. By providing a covering over the motor 60, the stator assembly also operates to smoothly guide the airflow from the fan wheel 40 smoothly around the motor 60. The stator assembly 50 is discussed in further detail in later sections of this specification.

Mixed Flow Fan Wheel Assembly—First Embodiment

Figure 3:
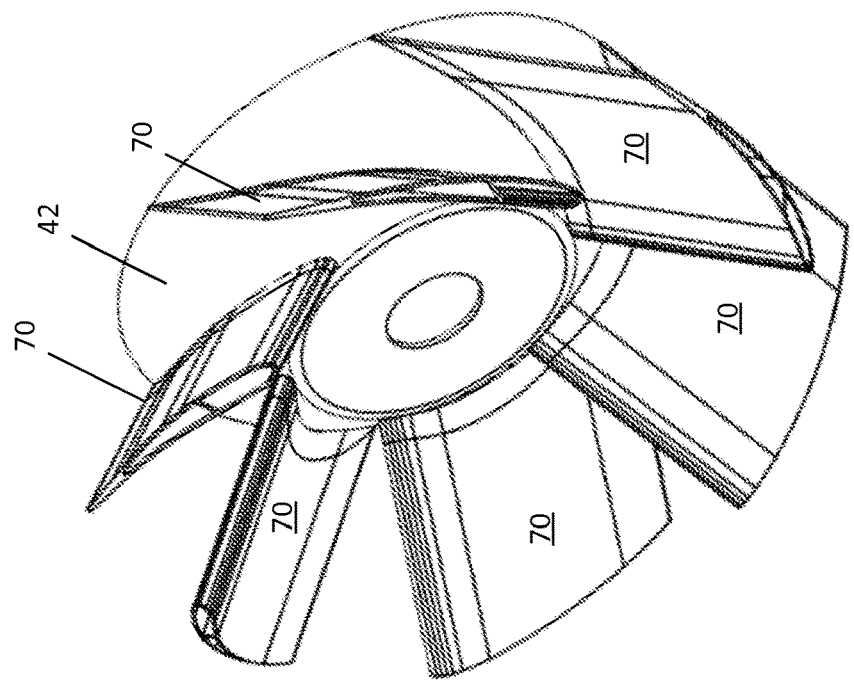
FIG. 3 is a perspective view of a portion of the fan wheel shown in FIG. 2, with the wheel cone and center hub removed.
Figure 2:
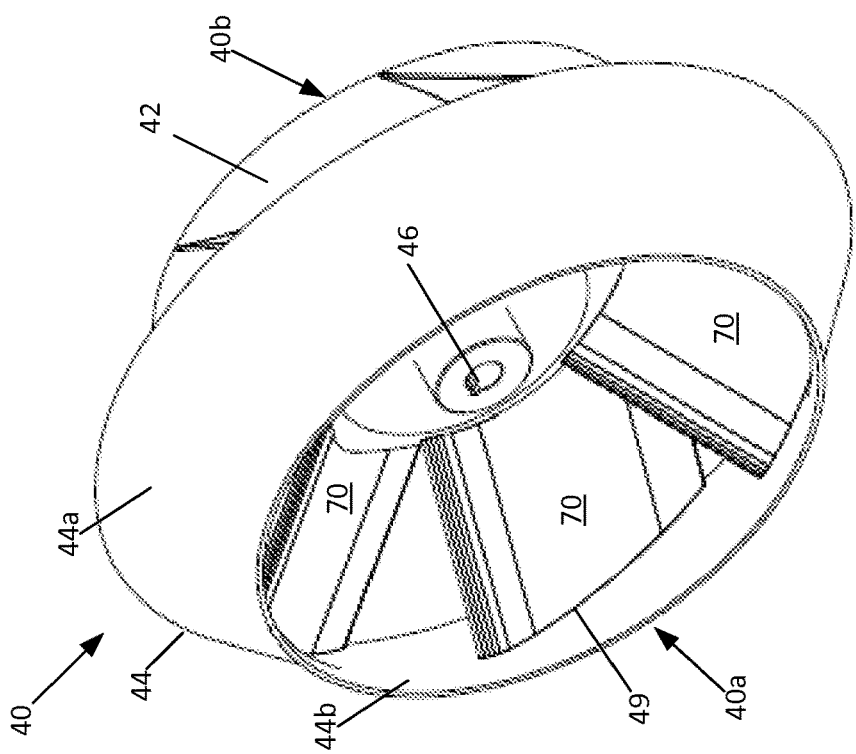
FIG. 2 is a perspective view of a mixed-flow fan wheel usable in the fan assembly shown in FIG. 1.

Referring to FIGS. 2-15, details of the fan wheel assembly 40 are further shown. It is noted that the wheel cone 44 of the fan wheel 40 is not shown in FIGS. 3, 5, and 7 for the purpose of providing further clarity. It is further noted that FIGS. 8-10 show only the wheel back 42 and that FIGS. 11-15 show only the fan wheel blades 70.

As stated previously, fan wheel assembly 40 is provided with a wheel back 42. The wheel back 42 has a base portion 42*c* and a flattened top portion 42*b*. As shown, the center hub or coupling mechanism 46 extends between the base portion 42*a* and the top portion 42*b*. As can be most easily seen at FIG. 9, the outer surface 42*a* of the wheel back 42 is curved or domed-shaped when viewed from the side such that the outer surface 42*a* forms a portion of a dome. The curvature of the outside surface 42*a* may have either a constant radius or a variable radius. It is noted that profile of the outer surface 42*a* could be straight when viewed from the side such that outer surface 42*a* forms a portion of a cone or a cylinder. Although the top portion is shown as being flattened, the top portion could be rounded or angled to match the profile of the outer surface 42*a* such that a more continuous or fully continuous dome or cone shape is produced. Thus, wheel back outer surface 42*a* may have a dome-shape, a truncated dome-shape, a cone-shape, a truncated cone-shape, or a cylindrical shape. It is also noted that, when viewed from above as shown in FIG. 10, both the base portion 42*c* and the top portion 42*b* are circular in shape, and thus have a rounded shape in this regard.

Referring to FIGS. 11-15, an example fan blade 70 is shown in greater detail. In one embodiment, the fan blade 70 is formed from a segment of an airfoil-shaped, double-walled extrusion, and in particular a segment of an aluminum extrusion. Other types of materials may be used instead of aluminum for the extruded fan blade 70. As shown, each fan blade 70 has a leading edge 71 and a trailing edge 72, between which a chord length CL is defined. The leading and trailing edges 71, 72 extend between a first end 73 and a second end 74 of the fan blade 70. As shown, the fan blade 70 has a top surface 75 and a bottom surface 76 separated by an internal hollow cavity 77. The presence of the cavity 77 results in the material forming the top and bottom surfaces 75, 76 having a material thickness t for the majority of the chord length of the blade 70. It is noted that the blade 70 can be formed with more or fewer hollow cavities without departing from the concepts presented herein. Also, the top and bottom surfaces 75, 76 together define an overall blade height H.

Figure 15:
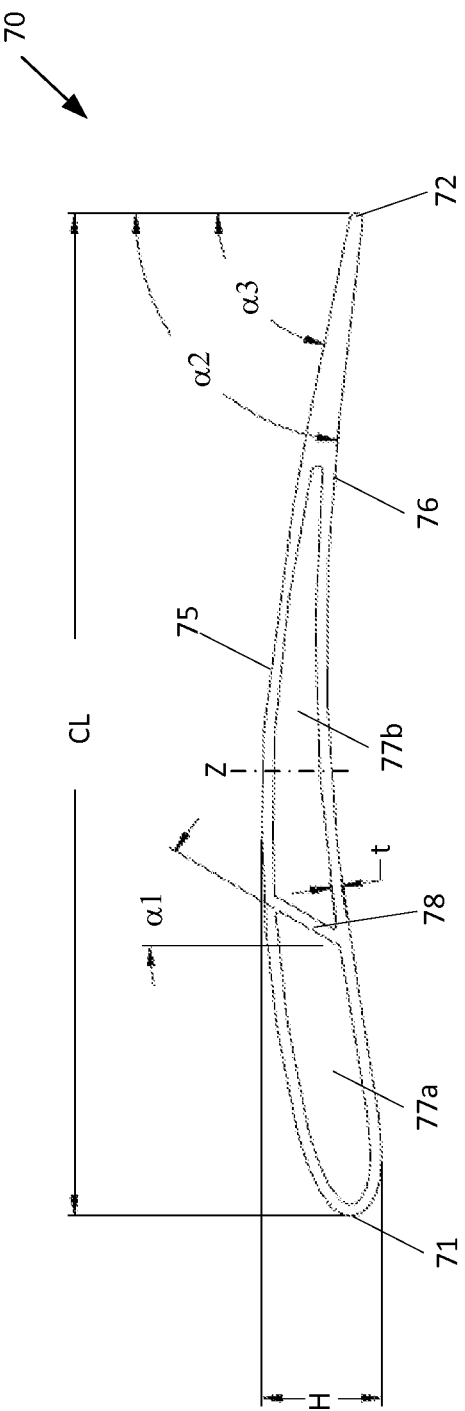
FIG. 15 is a side edge view of the fan blade shown in FIG. 11.

Referring to FIG. 15, it can be seen that the fan blade 70 further has a structural support post 78 that subdivides cavity 77 into a first sub-cavity 77*a* and a second sub-cavity 77*b*. As shown, the post 78 has an angle $\alpha 1$ with respect to axis Z. FIG. 15 also shows that the top surface has an initial angle $\alpha 2$ from the trailing edge 72 while the bottom surface has an initial angle $\alpha 3$ from the trailing edge. In the particular embodiment shown, H is about 1.1 inches, t is about 0.1 inches, CL is about 9.1 inches, $\alpha 1$ is about 21 degrees, $\alpha 2$ is about 73 degrees, and $\alpha 3$ is about 69 degrees. However, one skilled in the art upon learning of the disclosure herein will understand that many other fan blade 70 dimensions and shapes are possible. For example, the dimensions described herein are for a particular size and many larger and smaller sizes can be scaled from the disclosed embodiments.

When a fan blade 70 is positioned and oriented as desired with respect to wheel back 42, a three-dimensional fan blade interface contour projection 48 can be defined on the outer surface 42*a* of the wheel back 42. An example contour projection 48 for one of the blades 70 is shown at FIGS. 8-10. In one aspect, the contour projection 48 can be visualized as being the outline that could be drawn onto the wheel back outer surface 42*a* around an intersecting fan blade if it were possible to pass the end of the fan blade 70 through the outer surface 42*a* with the fan blade 70 placed in the desired orientation. Thus, the shape of the contour projection 48 is defined by the position and orientation of the blade 70 with respect to the back 42, and also by the shape of the outer surface 42*a* of the wheel back itself.

Figure 5:
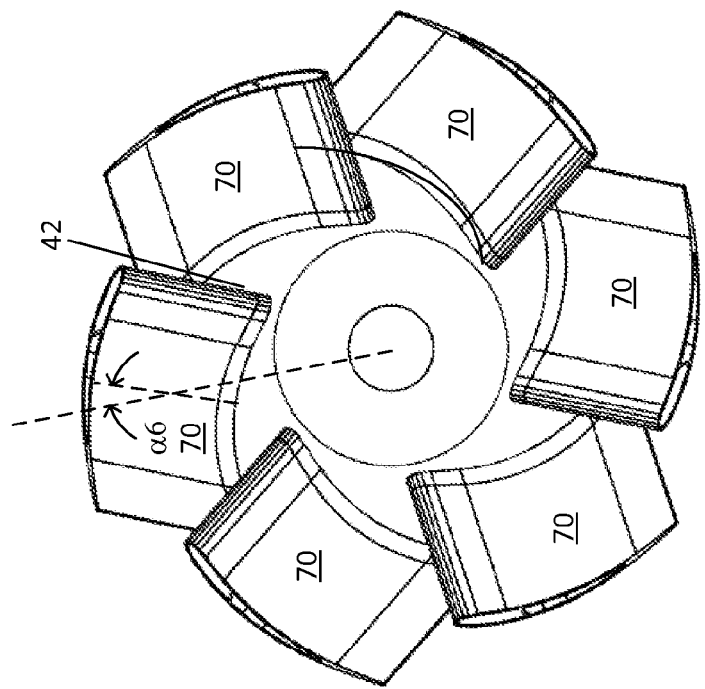
FIG. 5 is a front view of a portion of the fan wheel shown in FIG. 2, with the wheel cone and center hub removed.
Figure 4:
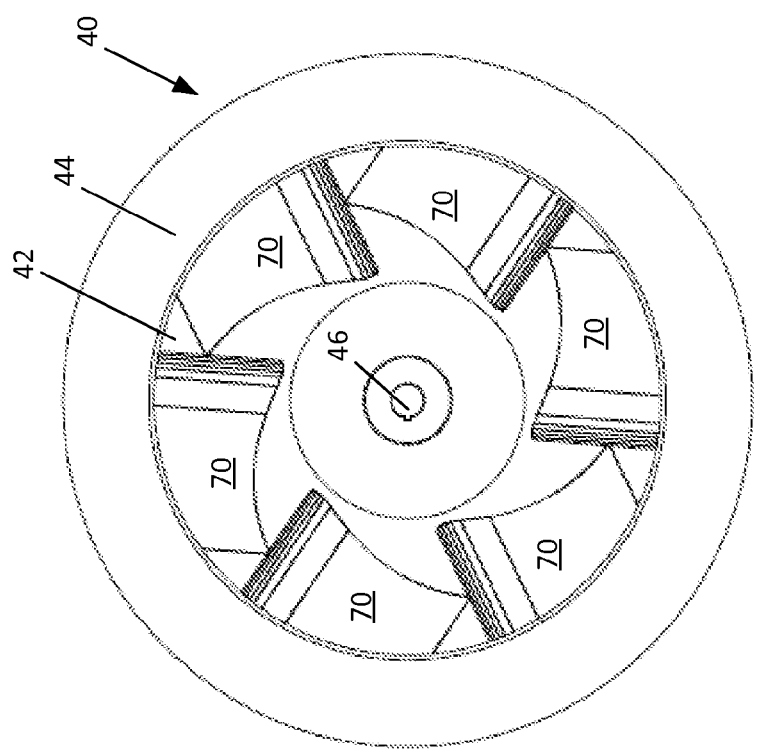
FIG. 4 is a front view of the fan wheel shown in FIG. 2.
Figure 7:
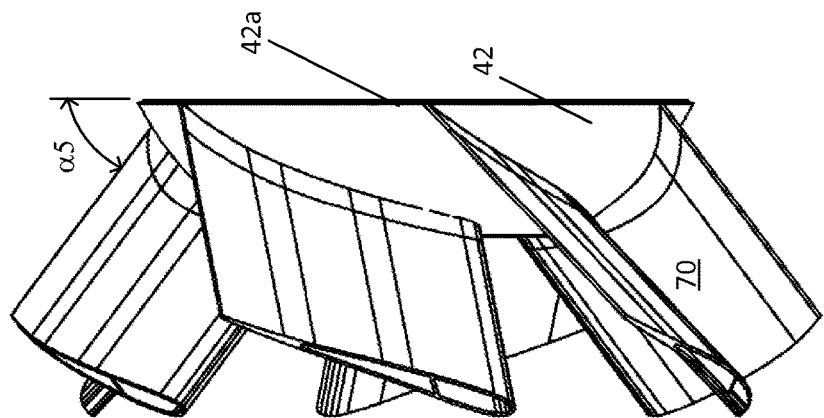
FIG. 7 is a side view of a portion of the fan wheel shown in FIG. 2, with the wheel cone and center hub removed.
Figure 6:
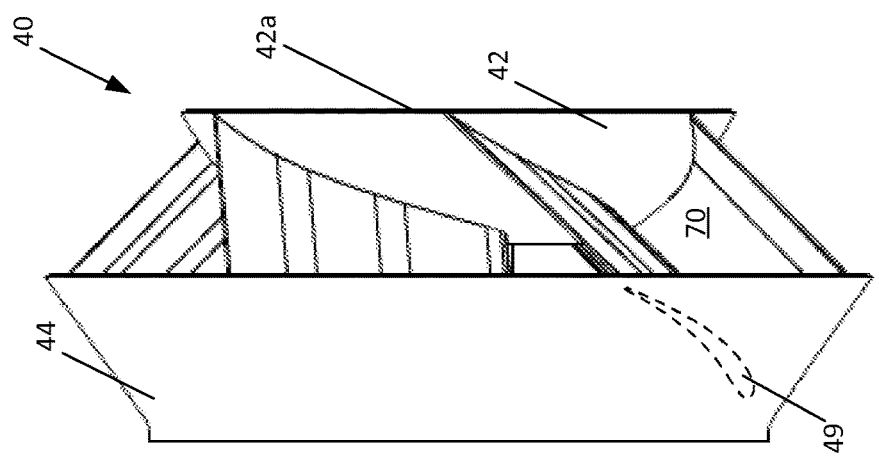
FIG. 6 is a side view of the fan wheel shown in FIG. 2.

The fan blade orientation is defined by the rotation of the fan blade 70 about the blade's 70 longitudinal axis L, transverse axis T, and centerline axis Z with respect to the wheel back 42. Axes L, T, and Z are shown at FIG. 11. The rotation of the blade about the longitudinal axis L operates to define an angle $\alpha 4$, such as a blade pitch angle, as shown at FIG. 9. The rotation of the blade 70 also operates to define an angle $\alpha 5$ of the fan blade 70 with respect to the back 42, as shown in FIG. 7. The rotation of the blade 70 also operates to define an angle $\alpha 6$ of the fan blade 70 with respect to the back 42, as shown in FIG. 5. As shown, $\alpha 4$ is about 24 degrees, $\alpha 5$ is about 37 degrees, and $\alpha 6$ is about 20 degrees although many other specific orientations are possible.

In order for the first end 73 of the fan blade 70 to be mounted flush to the wheel back outer surface 42*a*, meaning that generally no significant gaps are present between the blade material at the first end 73 and the outer surface 42*a*, the first end 73 must match the blade interface projection contour 48. As the fan blade 70 is formed from an extrusion, as opposed to being formed in a casting process, the first end 73 must be cut to match the projection contour 48. Where the outer surface 42*a* has a dome-shape and the blade first end 73 has a double-wall airfoil shape, the resulting cut required to match the projection contour 48 must be a compound cut that is curved in two directions. For example, FIG. 11 shows a curved cut line in a direction from the leading edge 71 to the trailing edge 72 of the fan blade 70 while FIG. 13 shows a curved cut line in a direction from the top surface 75 to the bottom surface 76 to the fan blade 70. Due to the complexity of the shape of the projection contour 48, this type of compound curved cut cannot be readily accomplished with a cutting machine having a flat blade, a rotating blade, a water jet cutter, or a laser cutting device. Therefore, the first end 73 must be cut by other processes, such as the use of a vertical machining center. Such an approach can involve at least two different types of cutting tools and CNC control of the cutting head and the work table to create an accurate profile. Where the outer surface 42*a* has a conical or cylindrical shape, instead of a dome shape, the first end 73 of a double-wall airfoil fan blade 70 will still require a compound cut with a curved cut line from the leading to trailing edge 71, 72. However, the cut from the top surface 75 to the bottom surface 76 will be a straight cut line instead of a curved cut.

The second end 74 of the fan blade 70 must also be cut in order to match the inside surface of the wheel cone 44. In the same manner that a projection contour 48 can be defined at the wheel back outer surface 42*a*, a second three-dimensional fan blade interface contour projection 49 can be defined at the wheel cone inner surface 44*b*. Accordingly, the description of the concepts regarding the shape and formation of the cut at the first end 73 is equally applicable to, and hereby incorporated by reference into, the description for the shape and formation of the cut at the second end 74. In the embodiment shown, the wheel cone 44 is a portion of a cone and therefore has a straight profile shape. Accordingly, where the blade second end 74 has a double-wall airfoil shape, the resulting cut required to match the projection contour 49 must be a compound cut that is curved in one direction and straight in another direction. For example, FIGS. 11-12 show a curved cut from the leading edge 71 to the trailing edge 72 of the fan blade 70 while FIGS. 13-14 show a straight cut from the top surface 75 to the bottom surface 76 to the fan blade 70. Where the inlet 44 has a curved profile, then the compound cut of the second end 74 would have two curved cuts rather than a single curved cut.

Once each blade 70 has been cut at the first and second ends 73, 74, the blades 70 can then be attached to the wheel back 42. In one embodiment, the wheel back 42 and blades 70 are metal, such as aluminum, and joined together by a welding process. In one embodiment, all of the components are manufactured from a soft aluminum, such as series 6000 aluminum. In one embodiment, 6063 designated aluminum is utilized. In one embodiment, 6061 designated aluminum is utilized. These components would include the wheel back 42, the fins, the wheel cone 44 and the machined hub or any combination of the above. Once welded together these components can be subjected to a tempering process, such as heating, cooling, hot working, cold working, naturally aging, artificially aging, stretching, and/or stretching to increase the strength of the material. In one embodiment, the components are subjected to a tempering process to result in a temper designation of T5 while in another embodiment, tempered to a T6 temper designation, for example to result in 6063-T5 or 6063-T6 aluminum, respectively. This approach is advantageous because the entire structure can be tempered to have near uniform strength whereas structures that are formed from tempered aluminum can lose significant strength at the weld locations due to complete or partial annealing caused by heating in certain welding process.

Mixed Flow Fan Wheel Assembly—Second Embodiment

Figure 17:
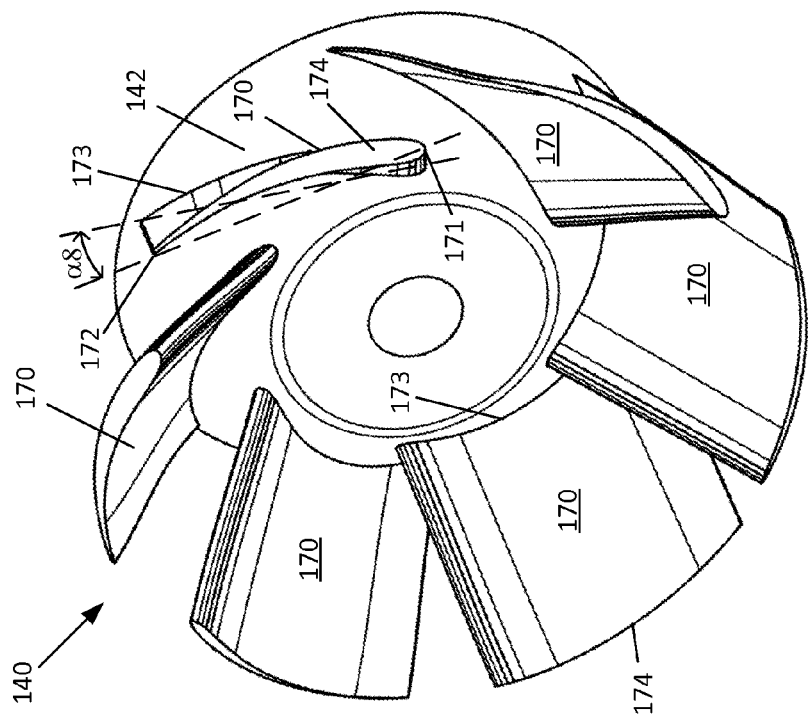
FIG. 17 is a perspective view of a portion of the fan wheel shown in FIG. 16 with the wheel cone and center hub removed.
Figure 16:
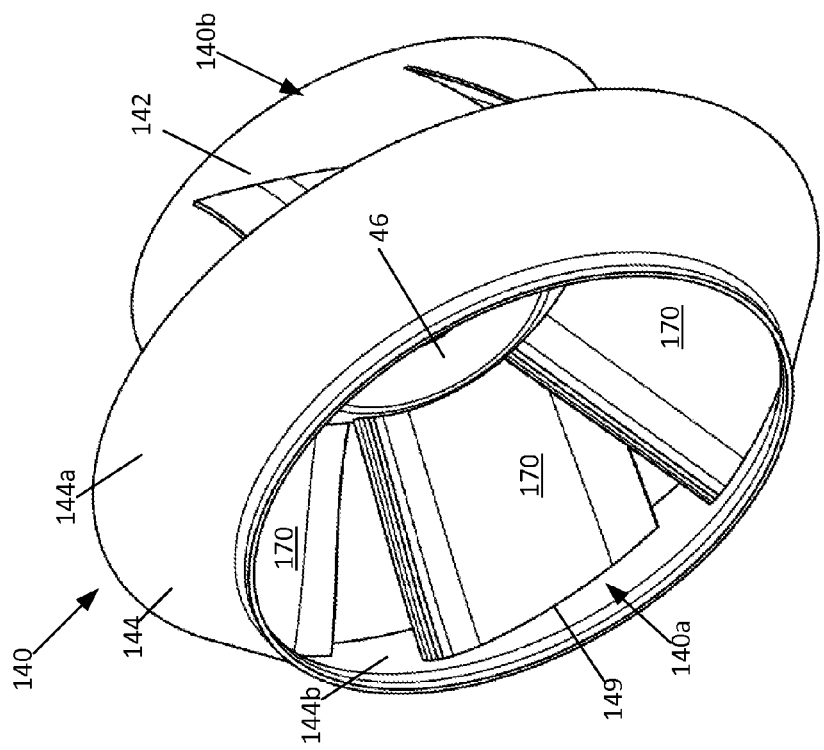
FIG. 16 is a perspective view of a second embodiment of a mixed-flow fan wheel usable in the fan assembly of FIG. 1 and having features that are examples of aspects in accordance with the principles of the present disclosure.

Referring to FIGS. 16-19, a second embodiment of a mixed-flow fan wheel 140 is shown that can be used in the fan assembly 10 shown in FIG. 1. As many of the concepts and features are similar to the first embodiment shown in FIGS. 1-15, the description for the first embodiment, and all other embodiments presented herein relating to fan wheels, is hereby incorporated by reference for the second embodiment. Where like or similar features or elements are shown, corresponding or like reference numbers will be used where possible (e.g. 170 instead of 70). Referring to FIG. 17, it can be seen that each blade 170 is twisted about a longitudinal axis L of the blade such that a chord line CL1 drawn at the first blade end 173 is disposed at an angle α8 with respect to a chord line CL2 drawn at the second end 174. As used herein, chord lines CL1 and Cl2 are each defined as a line extending in a direction from the leading edge 171 to the trailing edge 172 of the blade 174 at a given location along the extension of the blade 174. In the embodiment shown, the angle α8 is between about 5 degrees and about 45 degrees, for example about 10 degrees. In such a configuration, the trailing edge 172 of the blade 170 at the second end 174 is closer to the longitudinal axis X of the fan wheel than is the trailing edge 172 at the first end 173 which allows for increased efficiency of the fan wheel.

Mixed Flow Fan Wheel Assembly—Third Embodiment

Referring to FIGS. 20-25, a third embodiment of a mixed-flow fan wheel 40' without the wheel cone 44 shown is presented. As many of the concepts and features are similar to the first and second embodiments shown in FIGS. 1-19, the description for the first and second embodiments, and all other embodiments presented herein relating to fan wheels, is hereby incorporated by reference for the third embodiment. Where like or similar features or elements are shown, corresponding or like reference numbers will be used where possible (e.g. 270 instead of 70). The primary difference of the third embodiment 240 from the first and second embodiments 40, 140 is that the wheel back 242 of the third embodiment 240 is provided in conical form instead of having a dome shape. Because the shape of the wheel back 242 is conical, the blade interface projection contour shape is necessarily changed. Thus, a different cut at the first end 273 of the blade 270 is required. Similar to the first and second embodiments 40, 140, the cut at the first end 273 would still be a compound cut with a curved cut line extending between leading and trailing edges 271, 272. However, the cut line extending from the top surface 75 to the bottom surface 76 would be a straight cut line instead of having a curved direction. It is noted that although straight blades 270 are shown for the third embodiment 240, the blades could be twisted in the same manner as presented for the second embodiment 140 to result in a fan wheel with twisted blades and a conical wheel back.

Mixed Flow Fan Wheel Assembly—Fourth Embodiment

Referring to FIGS. 26-29, a fourth embodiment of a fan wheel 340 is presented along with an inlet structure 331 that combines the bell inlet 330 and wheel cone 344. As many of the concepts and features are similar to the first to third embodiments shown in FIGS. 1-25, the description for the first to third embodiments, and all other embodiments presented herein relating to fan wheels, is hereby incorporated by reference for the fourth embodiment 340. Where like or similar features or elements are shown, corresponding or like reference numbers will be used where possible (e.g. 370 instead of 70).

Figure 45:
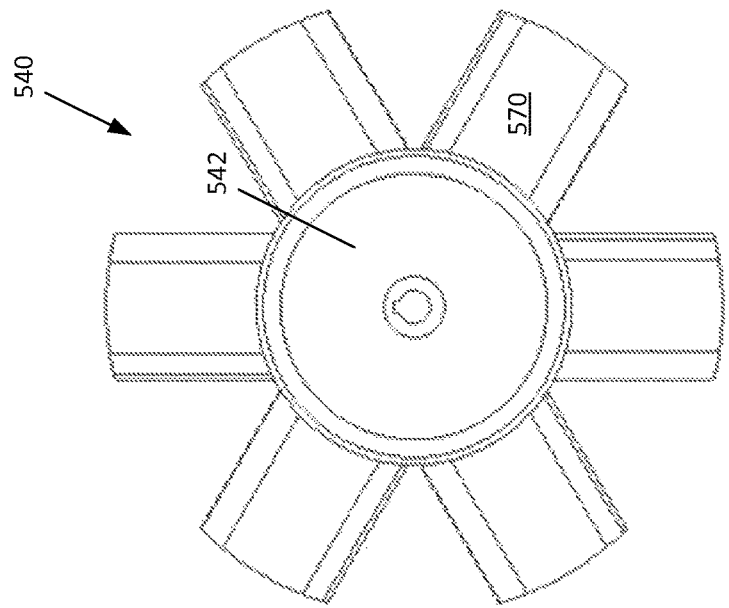
FIG. 45 is a bottom view of the fan wheel shown in FIG. 41.
Figure 44:
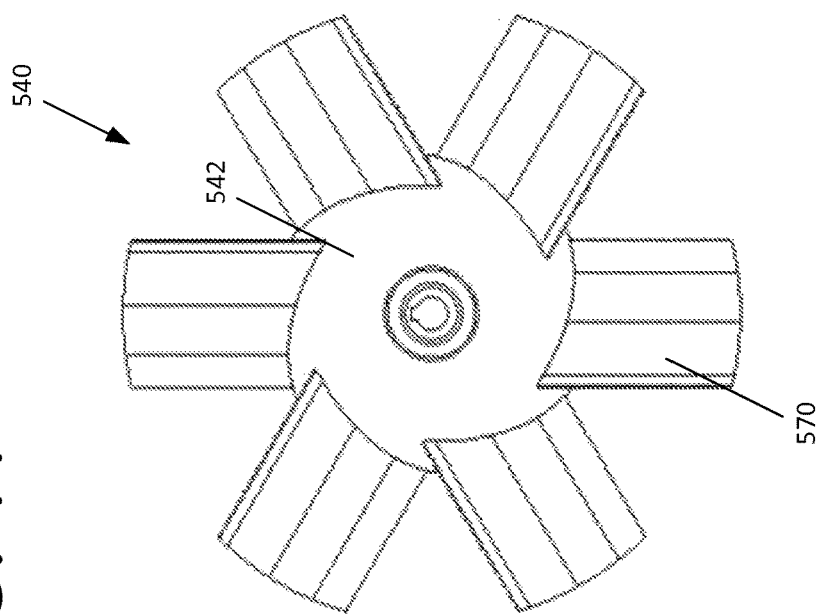
FIG. 44 is a top view of the fan wheel shown in FIG. 41.
Figure 46:
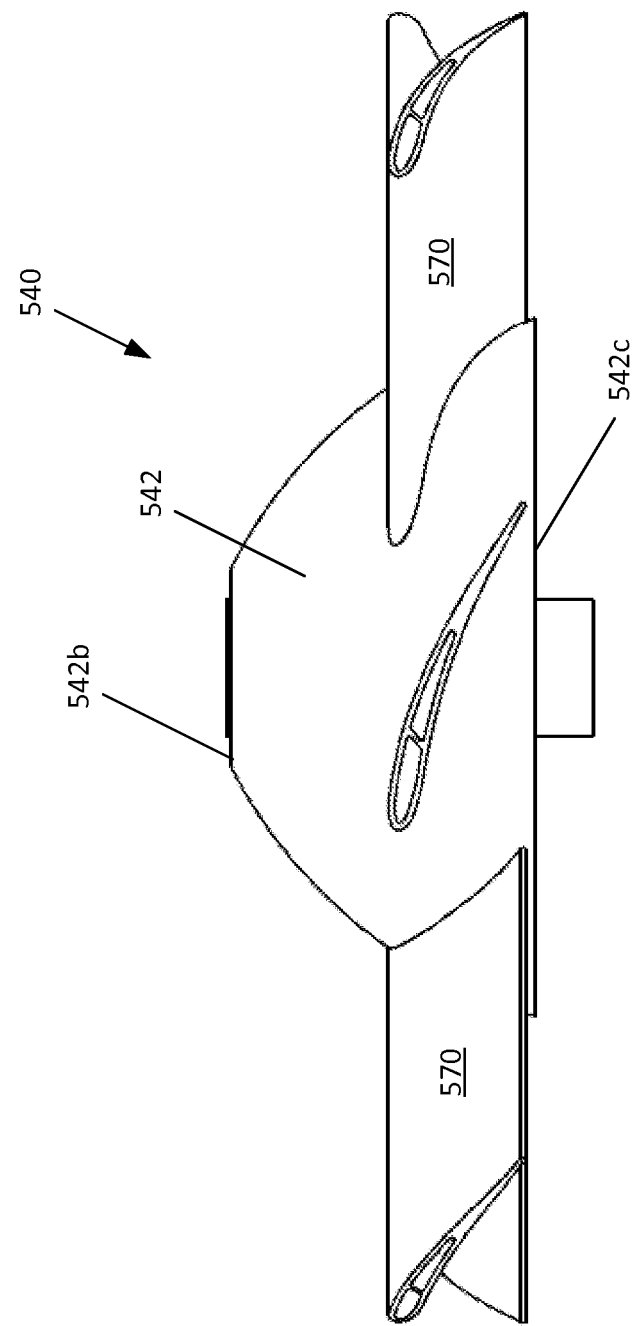
FIG. 46 is a side view of the fan wheel shown in FIG. 41.

Referring to FIG. 45, the fan wheel 340 is shown in an exploded view and is provided with a conical base or wheel back 342 and straight blades 370. However, and as mentioned previously for other embodiments, fan wheel 340 may be provided with twisted blades and/or a dome shaped wheel back.

Figure 29:
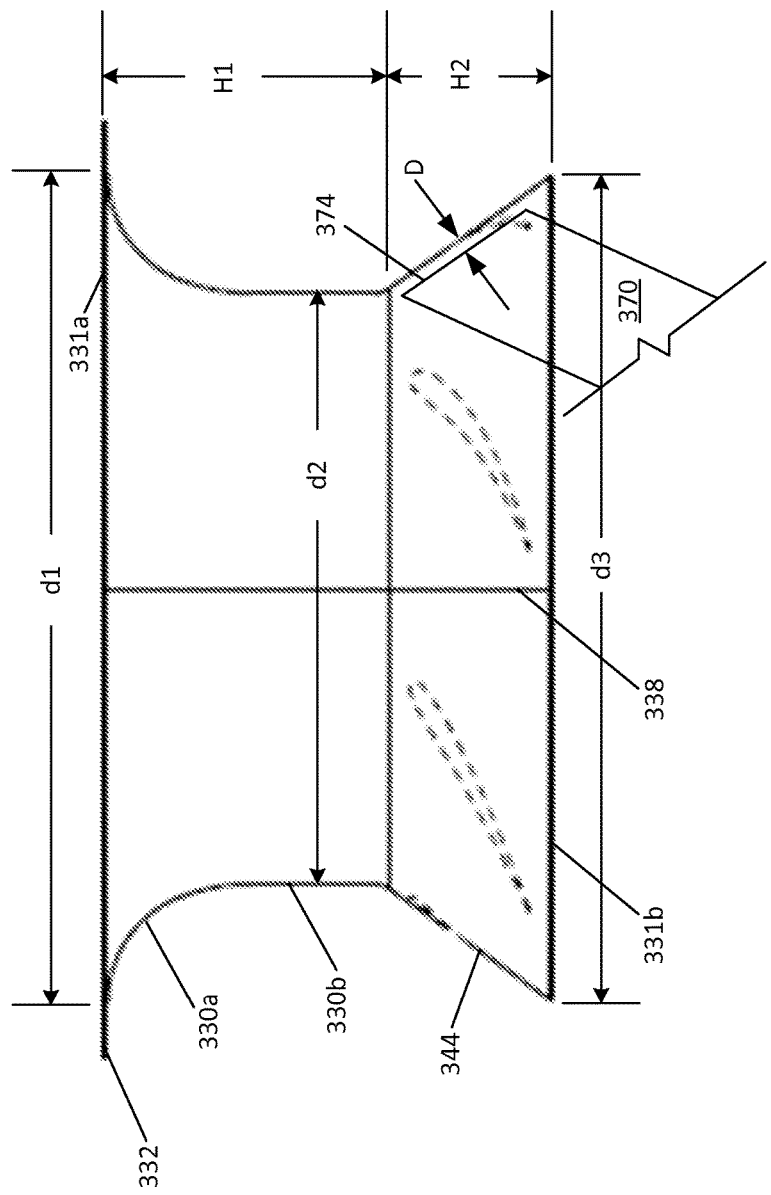
FIG. 29 is a side view of the combined wheel cone and bell cone of FIG. 26.
Figure 30:
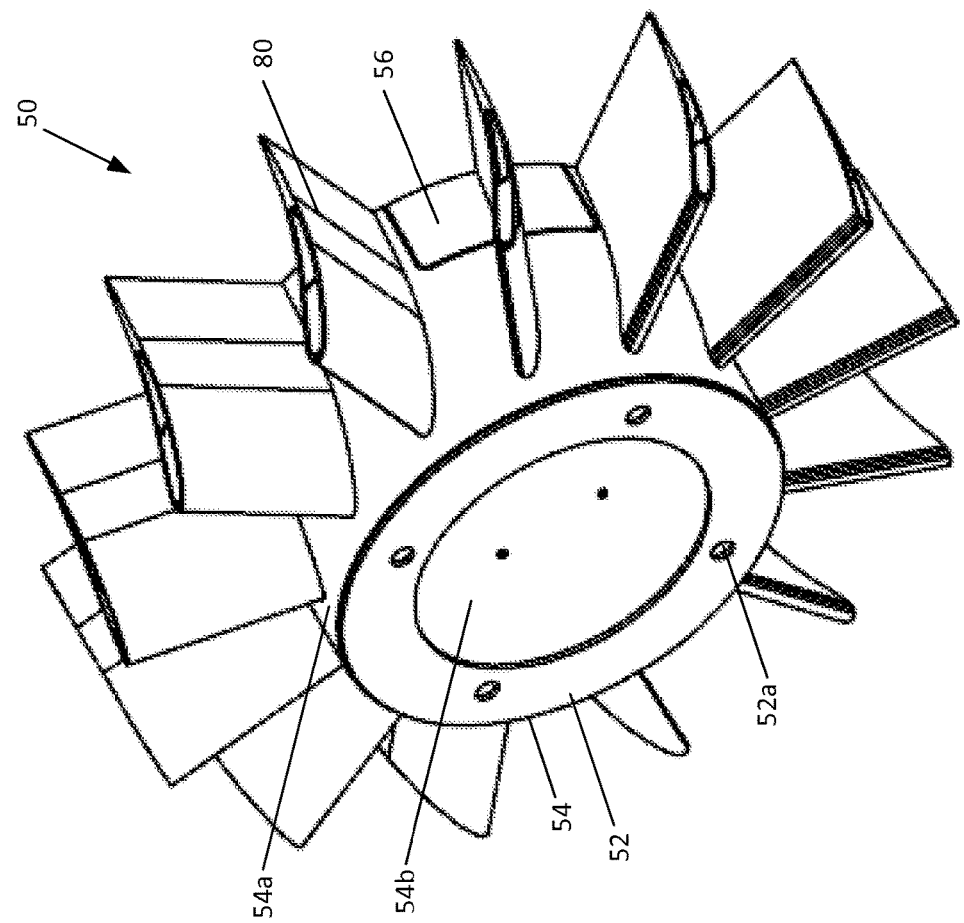
FIG. 30 is a perspective view of a stator assembly usable with the fan assembly shown in FIG. 1.
Figure 32:
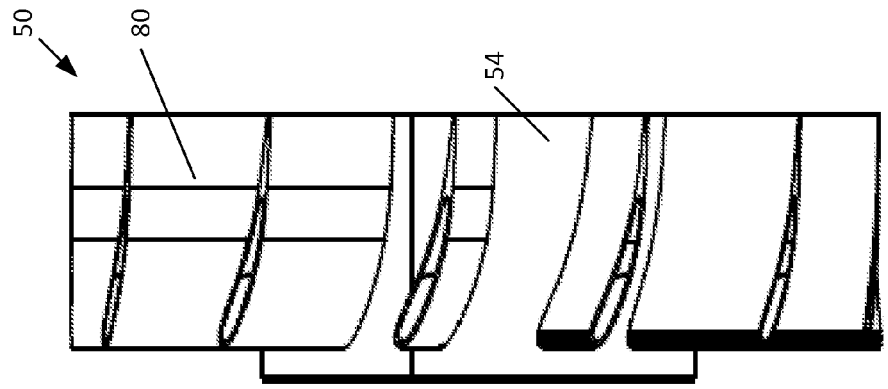
FIG. 32 is a side view of the stator assembly shown in FIG. 30.
Figure 31:
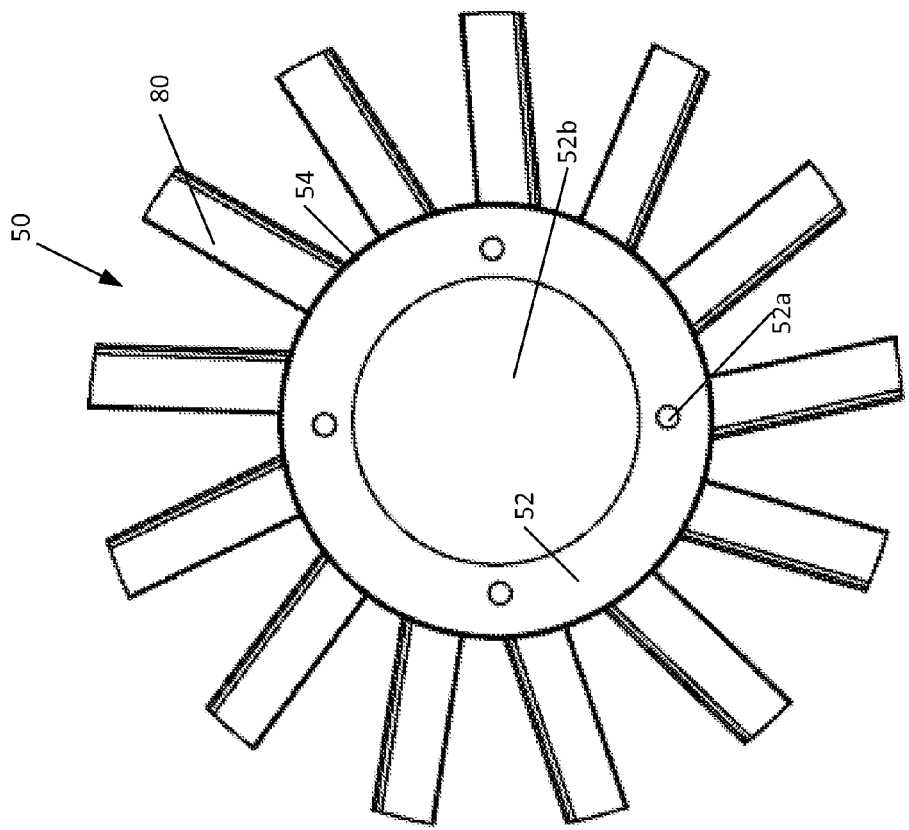
FIG. 31 is a front view of the stator assembly shown in FIG. 30.

In contrast to the first to third embodiments, each of the fan blades 370 of the fourth embodiment of the fan wheel 340 has a free second end 374 rather than being directly attached to a wheel cone 344. As configured, the wheel cone 344 and the fan wheel 340 are aligned along a common central axis X and spaced apart a distance D along the axis X. Referring to FIG. 29, distance D is defined as the distance between the second end 374 of the blade 370 and the inside surface 344*b* of the wheel cone 344. As such, the blade second ends 374 are received within the wheel cone portion 344, but are not in contact with the inner surface 344*b* of the wheel cone portion 344. In one embodiment, distance D is from about 1 millimeter to about 3 millimeters. In order to minimize distance D as much as possible, it is preferred that the blades 370 are cut to have a contour cut profile matching the inside surface 344*b* at the second ends for maximum efficiency, in the same manner as already described for the first embodiment.

As shown, the inlet structure 331 is a unitary structure having an air inlet 331*a* and an outlet 331*b*. The inlet structure 331 incorporates the wheel cone 344 and the bell inlet 330. It is noted that the inlet structure may be formed from a single piece of material or from multiple pieces of material. For example, the wheel cone 344 could be formed from a first sheet of material and the bell inlet 330 could be formed from a second sheet of material wherein the formed wheel cone 344 and bell inlet 330 are joined together via welding, mechanical fasteners, or other joining means known in the art. In the embodiment shown, the inlet structure 331 is formed from a single galvanized sheet in a rolling process to define a bell inlet portion 332 and an inlet cone portion 344. Other suitable materials are cold rolled steel, stainless steel, and aluminum sheet.

As shown, the bell inlet portion 330 includes a flange portion 332, a narrowing portion 330*a*, and a generally cylindrical portion 330*b*. The narrowing portion 330*a* can be formed by a curved radius that transitions the inlet 331*a* of the inlet structure 331 between a first diameter d1 defined by the inside of the flange portion 332 and a second diameter d2 defined by generally cylindrical portion 330*b*. As shown, the wheel cone portion 334 towards the inlet end 331*a* has a diameter d2 and expands to a diameter d3 at the outlet 331*b* of the inlet structure 331. As shown, the inlet cone portion 344 is presented in the shape of a truncated cone. However, the inlet cone portion 344 could be provided with a curved or truncated dome shape. As most easily seen at FIG. 29, diameters d1 and d3 are both greater than diameter d2. In one embodiment, diameters d1 and d3 are generally equal. Still referring to FIG. 29, it can be seen that the bell inlet portion 330 has a first height H1 and the wheel cone portion 344 has a second height H2. As shown, first height H1 is greater than second height H2. As shown in FIG. 29, the following are approximate dimensions: d3=27.8 inches, d1=27.9 inches, d2=9.7 inches, H1=9.2 inches and H2=6 inches. In general, d1 is close to the same dimension as d3 in some applications, for example, d1 is within about 5% of d3. In one embodiment, d3 is within about 1% of d1 and d2 is within about 30% of d1.

As a result of the rolling process, a lead edge 334 of the sheet is joined with a trailing edge 336 of the sheet to form a seam line 338. The lead edge 334 may be joined to the trailing edge 336 at the location of the seam line 338 by a welding process, for example by plasma arc welding. Plasma arc welding of the seam line 338 is preferable because this type of welding can be performed such that that it does not significantly damage the galvanized protective coating in the area of the weld. Additionally, this type of welding can be done to minimize the overall height of the weld which reduces or eliminates the need to grind on the outer tube prior to forming the flange on the welded tube. By minimizing the amount of galvanized coating that is damaged in the welding process, the tube can be manufactured with minimal or no additional post processing to protect the weld area using paint or other protective coatings. It is noted that at least the wheel cone portion 344 should be as round as possible such that the gap between the blade second ends 374 and the inner wheel cone surface 344*b* (i.e. distance D) is as small as possible.

In one embodiment, the inlet structure 331 is attached to the fan assembly 10 via flange 332, which is shown as having a plurality of mounting holes 332*a*. The flange 332 is aligned and attached to the first flange 22 of the housing 20 such that mounting holes 22*a* provided on the first flange 22 are aligned with the mounting holes 332*a* on flange 332. Mechanical fasteners (not shown) can be used to secure the flanges together, and to ensure alignment of the inlet structure 331 with respect to the fan wheel 340. In one embodiment, the inlet structure 331 is attached to the fan assembly by a TOG-L-LOC® connection or similar connection method, or by welding.

Stator Assembly

Figure 19:
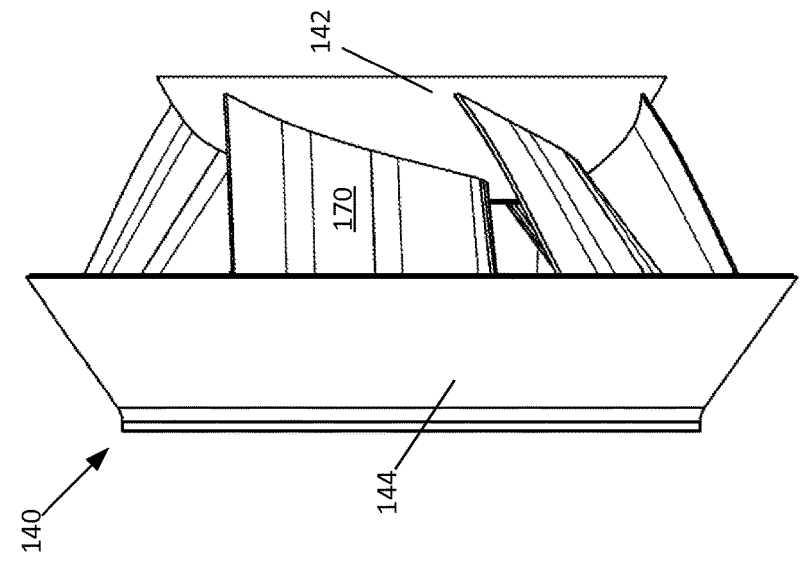
FIG. 19 is a side view of the fan wheel shown in FIG. 16.
Figure 18:
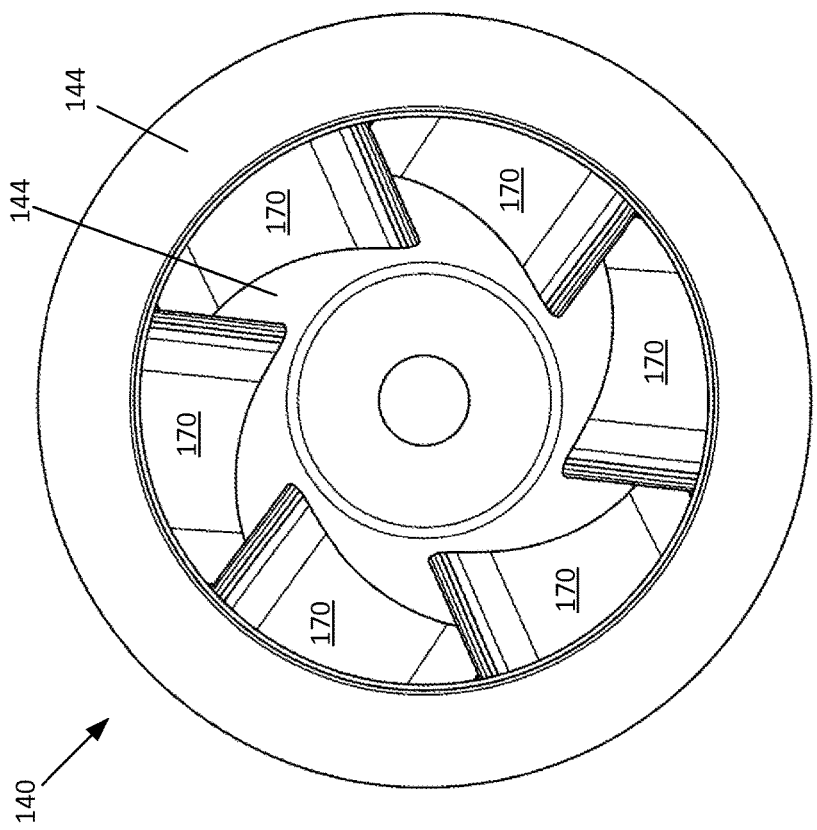
FIG. 18 is a top view of the fan wheel shown in FIG. 16.
Figure 21:
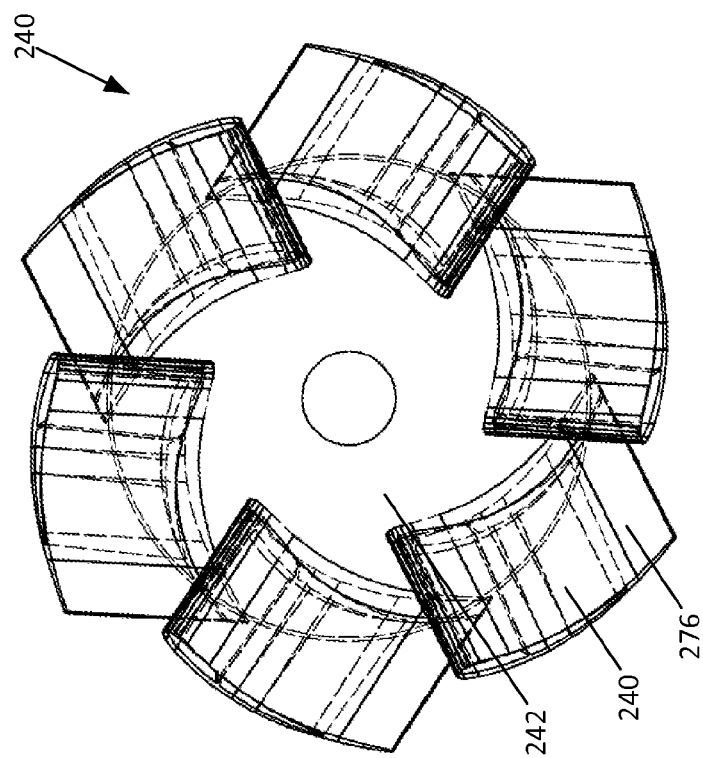
FIG. 21 is a top view of the fan wheel shown in FIG. 20.
Figure 20:
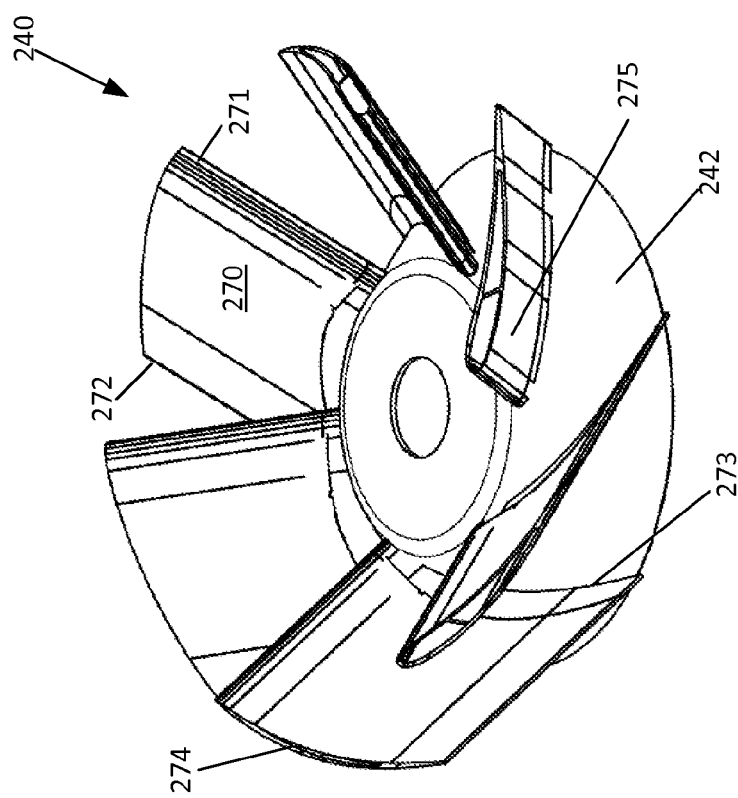
FIG. 20 is a perspective view of a third embodiment of a mixed-flow fan wheel usable in the fan assembly of FIG. 1 and having features that are examples of aspects in accordance with the principles of the present disclosure.
Figure 24:
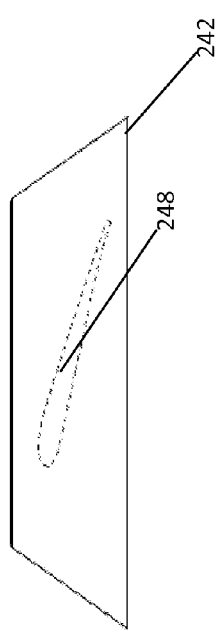
FIG. 24 is a side view of a portion of the fan wheel shown in FIG. 20.
Figure 25:
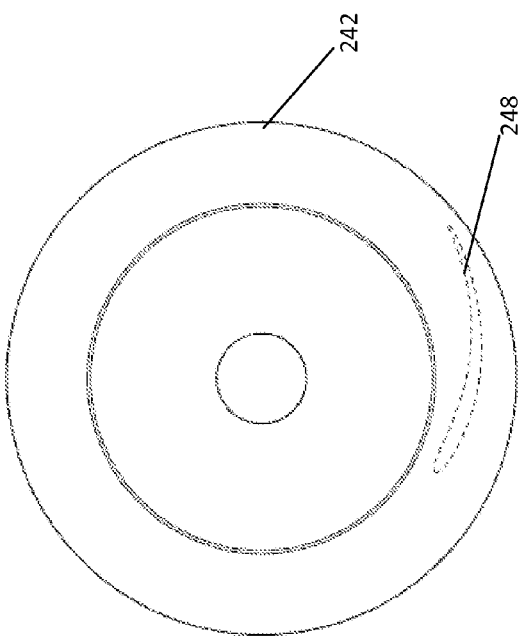
FIG. 25 is a top view of a portion of the fan wheel shown in FIG. 20.
Figure 23:
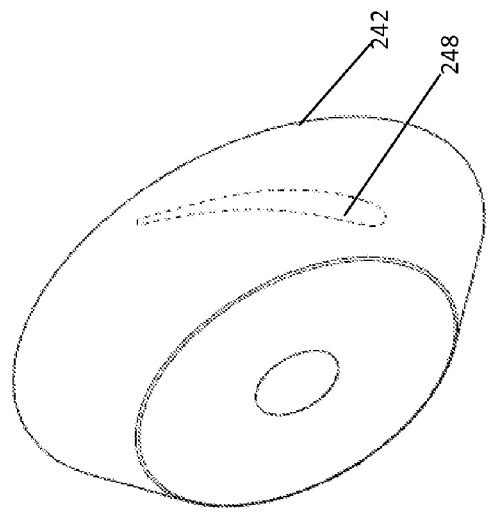
FIG. 23 is a front perspective view of a portion of the fan wheel shown in FIG. 20.
Figure 28:
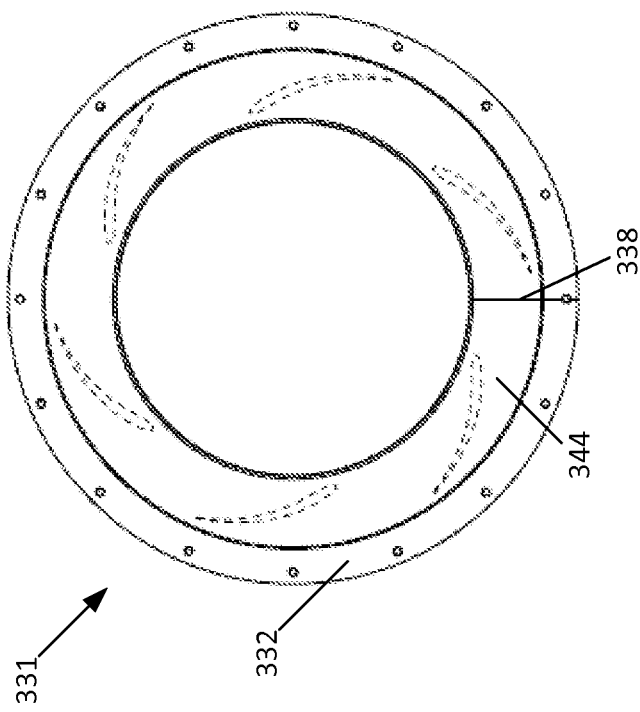
FIG. 28 is a top view of the combined wheel cone and bell cone of FIG. 26.
Figure 27:
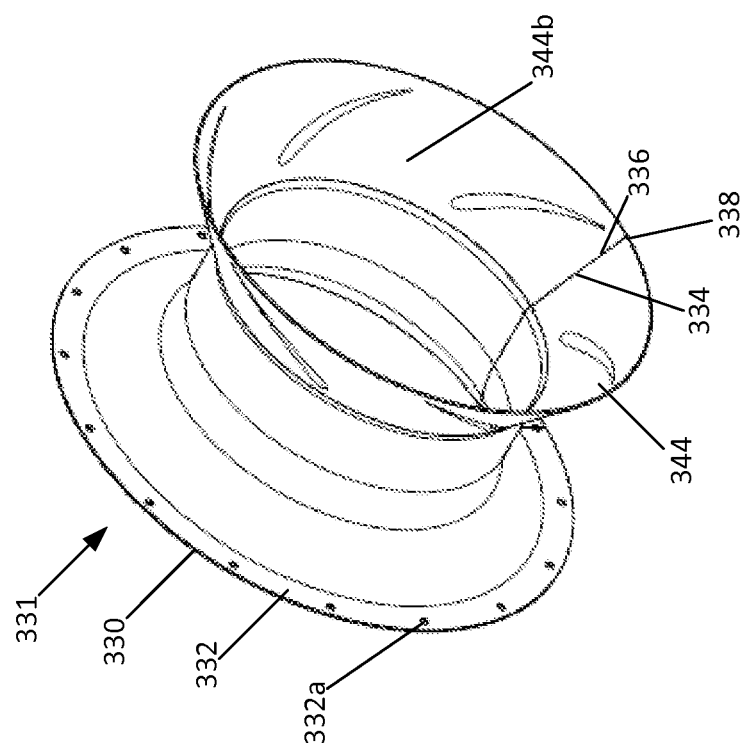
FIG. 27 is a perspective view of a combined wheel cone and bell cone usable with the fan assembly of FIG. 26.

Referring to FIGS. 30-39, the stator assembly 50 is shown in greater detail. It is noted that FIGS. 19-22 show an example of one of the stator blades 80 shown in FIGS. 16-18 while FIG. 19 shows only the inner housing tube 54 of the stator assembly. As stated previously, the stator assembly 50 serves the functions of supporting the motor 60, guiding the airflow from the fan wheel 40 smoothly around the motor 60, and straightening the airflow leaving the fan wheel 40.

As stated previously, stator assembly 40 is provided with an inner housing tube 54 that is generally cylindrical in shape although other shapes could be utilized. The inner housing 54 is configured to accept the mounting flange 52 having a central aperture 52*b* which may be integral to the housing 54 or formed separately and mechanically coupled to the inner housing 54, such as by welding or mechanical fasteners. The mounting flange 52 is provided with a number of mounting holes 52*a* that match corresponding holes on the electric drive motor 60 such that bolts may pass through the mounting flange 52 to support the motor 60. The inner housing 54 may be configured to accept differently configured mounting flanges to accommodate a particular motor 60 or motor size that is to be used in the fan assembly 10. The notch 56 in the inner housing 54 is provided for those motor sizes having a junction box that exceeds the inner diameter of the inner housing such that the junction box can be accommodated and accessed. The stator blades 80 of the stator assembly are radially spaced about and connected to the inner housing 54. In the embodiment shown, 13 stator blades 80 are provided. However, more or fewer stator blades 80 may be used without departing from the concepts presented herein.

Referring to FIG. 30-39, an example stator blade 80 is shown in greater detail. It is noted that many of the aforementioned concepts described for the fan blade 70 are applicable for the stator blade 80. Accordingly, the description for the fan blade 70 is hereby incorporated by reference into the description for the stator blade 80. In one embodiment, and similarly to fan blade 70, the stator blade 80 is formed from a segment of an airfoil-shaped, double-walled extrusion, and in particular a segment of an aluminum extrusion. Other types of materials may be used instead of aluminum for the extruded stator blade 80. Also, the stator blade 80 and the fan blade 70 may be formed from segments of the same extrusion.

As shown, each stator blade 80 has a leading edge 81 and a trailing edge 82, between which a chord length CL2 is defined. The leading and trailing edges 81, 82 extend between a first end 83 and a second end 84 of the stator blade 80. As shown, the stator blade 80 has a top surface 85 and a bottom surface 86 separated by an internal hollow cavity 87. The presence of the cavity 87 results in the material forming the top and bottom surfaces 85, 86 having a material thickness T2 for the majority of the chord length of the blade 80. It is noted that the blade 80 can be formed with more or fewer hollow cavities without departing from the concepts presented herein. Also, the top and bottom surfaces 85, 86 together define an overall blade height H2. The hollow cavities 87 in the stator blades can also be used to run the motor electrical cabling or wires 61 from the motor 60 to the outside of the housing 20, as shown schematically in FIG. 39. Where this type of routing is utilized, the notch or cut-out 56 in the inner tube 54 is not necessarily needed. Also, this type of routing also eliminates the need for a conduit box in the airstream thus improving the performance of the fan, for example a 2% improvement in overall fan efficiency.

Figure 38:
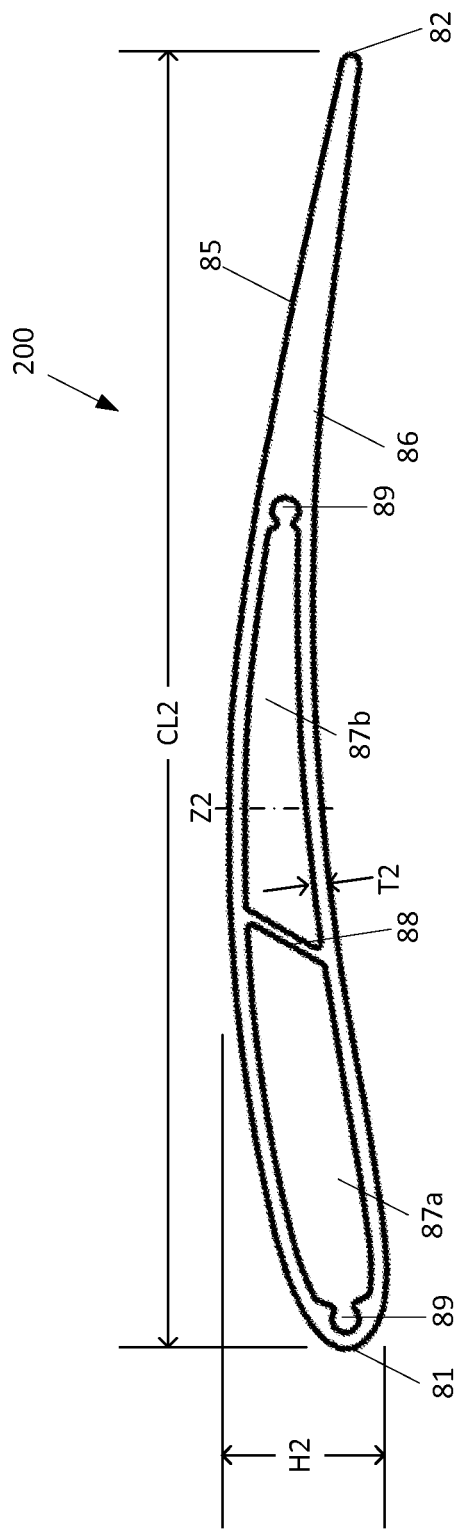
FIG. 38 is a side edge view of the stator blade shown in FIG. 34.

Referring to FIG. 38, it can be seen that the stator blade 80 further has a structural support post 88 that subdivides cavity 87 into a first sub-cavity 87*a* and a second sub-cavity 87*b*. Additionally, the stator blade 80 is shown as being provided with two anchor cavities 89. The anchor cavities 89 line up with corresponding apertures 57 in the inner housing 54 as well as apertures 47 in the outer fan housing 20, and are configured to accept mounting screws to secure the stator blades 20. Thus, the inner housing 50 is secured within the outer housing 20 by the stator blades 80. Alternatively, the stator blades 80 could be welded or otherwise secured to the inner housing and/or outer housing 20.

In general, the stator blade 80 has a cross-sectional profile similar to that shown for the fan blade 70. Thus, the stator blade 80 has generally the same values for the angles corresponding to α1, α2, and α3 shown for the fan blade 70. In the particular embodiment shown, H2 is about 1.1 inches, T2 is about 0.1 inches, and CL2 is about 9.1 inches. However, one skilled in the art upon learning of the disclosure herein will understand that many other stator blade 80 dimensions and shapes are possible.

Figure 33:
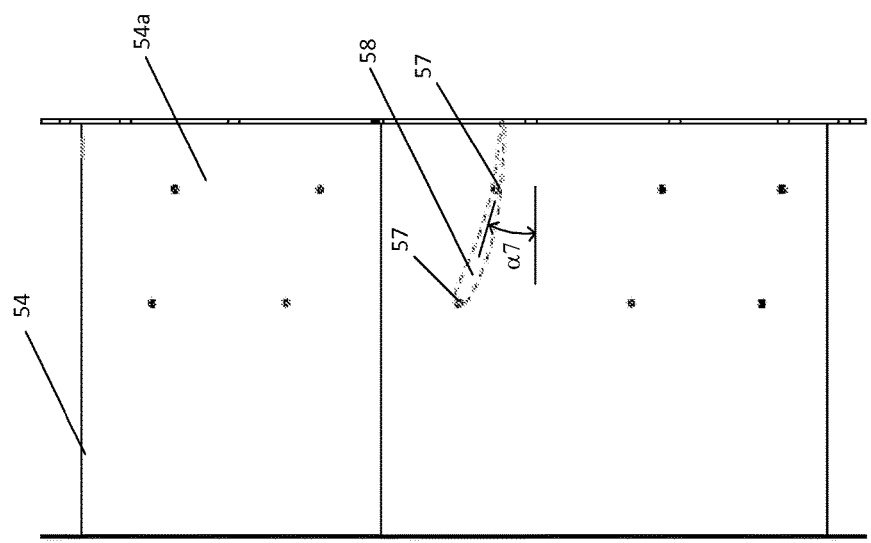
FIG. 33 is a side view of a portion of the stator assembly shown in FIG. 30.

When a stator blade 80 is positioned and oriented as desired with respect to the inner housing 54, a three-dimensional fan blade interface contour projection 58 can be defined on the outer surface 54*a* of the inner housing 54. An example contour projection 58 for one of the blades 80 is shown at FIG. 33. In one aspect, the contour projection 58 can be visualized as being the outline that could be drawn onto the inner housing outer surface 54*a* around an intersecting stator blade 80 if it were possible to pass the end of the stator blade 80 through the outer surface 54*a* with the stator blade 80 placed in the desired orientation. Thus, the shape of the contour projection 58 is defined by the position and orientation of the blade 80 with respect to the housing 54, and also by the shape of the outer surface 54*a* of the housing itself.

The stator blade orientation is defined by the rotation of the stator blade 80 about the blade's 80 longitudinal axis L2, transverse axis T2, and centerline axis Z2 with respect to the housing 54. Axes L2, T2, and Z2 are shown at FIG. 34. In the embodiment shown, the stator blade 80 is oriented generally orthogonally to the outer surface 54*a* such that the longitudinal axis L2 is perpendicular to the outer housing surface 54*a* and the transverse axis T2 is parallel to the outer housing surface 54*a*. However, the stator blade 80 is shown as being rotated about the centerline axis Z2 such that the blade 80 can more adequately form an air straightening function with the leading edge 81 being positioned to receive the rotating air at an angle and the trailing edge 82 being aligned with the desired direction of the leaving airflow, which is aligned with the longitudinal axis X of the fan assembly 10. Referring to FIG. 19, the blade 80 is rotated about the Z2 axis to create an angle α7 with respect to plane defined with the outer surface 54*a* which coincides with the longitudinal axis X of the fan assembly 10. As shown, α7 is about 14 degrees although many other specific orientations are possible.

In order for the first end 83 of the stator blade 80 to be mounted flush to the inner housing outer surface 54*a*, meaning that generally no significant gaps are present between the blade material at the first end 83 and the housing outer surface 54*a*, the first end 83 must match the blade interface projection contour 58. As the stator blade 80 is formed from an extrusion, as opposed to being formed in a casting process, the first end 83 must be cut to match the projection contour 58. Where the outer surface 54*a* has a cylindrical shape and the blade end 83 has a double-wall airfoil shape, as shown, the resulting cut required to match the projection contour 58 must be a compound cut that is curved in one direction and linear or straight in another direction. For example, FIGS. 34-37 show a slightly curved cut from the leading edge 81 to the trailing edge 82 of the blade 80 and a generally linear cut from the top surface 85 to the bottom surface 86 of the blade 80.

The second end 84 of the stator blade 80 must also be cut in order to match the inside surface of the fan housing 20. In the same manner that a projection contour 58 can be defined at the inner housing outer surface 54*a*, a three-dimensional blade interface contour projection 55 can be defined at the inner surface 20*b*. Accordingly, the description of the concepts regarding the shape and formation of the cut at the first end 83 is equally applicable to, and hereby incorporated by reference into, the description for the shape and formation of the cut at the second end 84. Accordingly, where the blade second end 84 has a double-wall airfoil shape, the resulting cut required to match the projection contour at the fan housing inner surface 20*b* must be a compound cut that is curved in one direction and straight in another direction, as shown at FIGS. 34-37.

Once each blade 80 has been cut at the first and second ends 83, 84, the blades 70 can then be attached to the inner and outer housings 54, 20. In one embodiment, the housings 20, 54 and the blades 80 are metal, such as aluminum.

Figure 39:
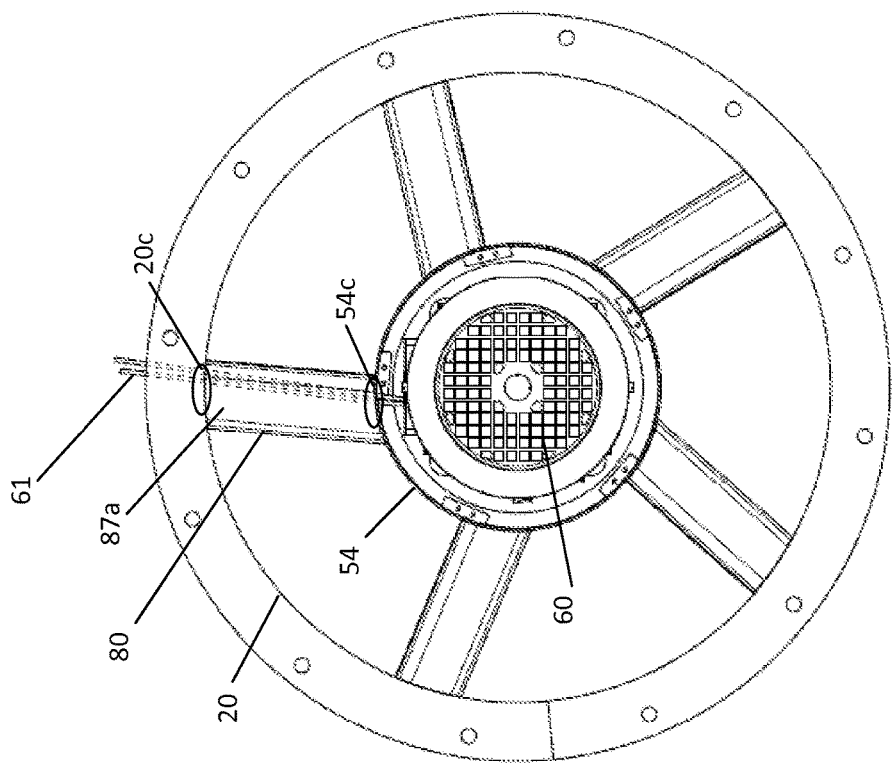
FIG. 39 is a cross-sectional schematic view of the fan assembly of FIG. 1 at the location of the stator assembly shown in FIG. 30 with motor wiring routed through a stator blade.

Referring to FIG. 39, it is shown that the power wiring 61 for the stator assembly 50 can be routed through the internal cavities 87*a*, 87*b* of one of the stator blades 80 such that a conduit extending between the inner housing 54 and the outer housing 20 is not required. This arrangement can result in a fan efficiency gain, for example an efficiency gain of about two percentage points. As shown, the inner housing 54 is provided with an aperture 54c that is aligned with the internal cavity 87a and/or 87b. The outer housing 20 is also provided with an aperture 20c that is aligned with the internal cavity 214a as well.

Axial Flow Fan Assemblies—General Description

Figure 40:
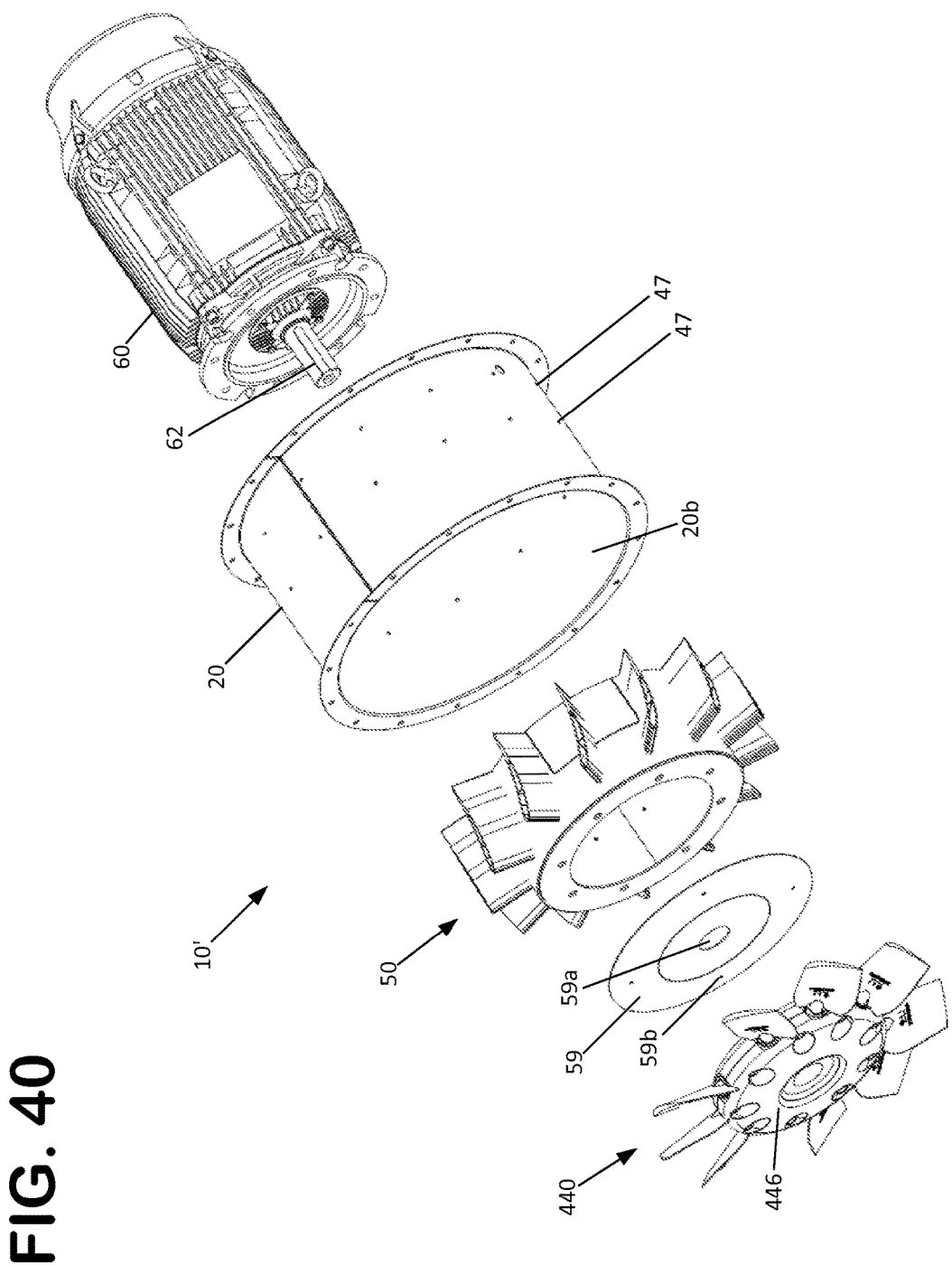
FIG. 40 is an exploded perspective view of a second embodiment of a fan assembly having features that are examples of aspects in accordance with the principles of the present disclosure.
Figure 41:
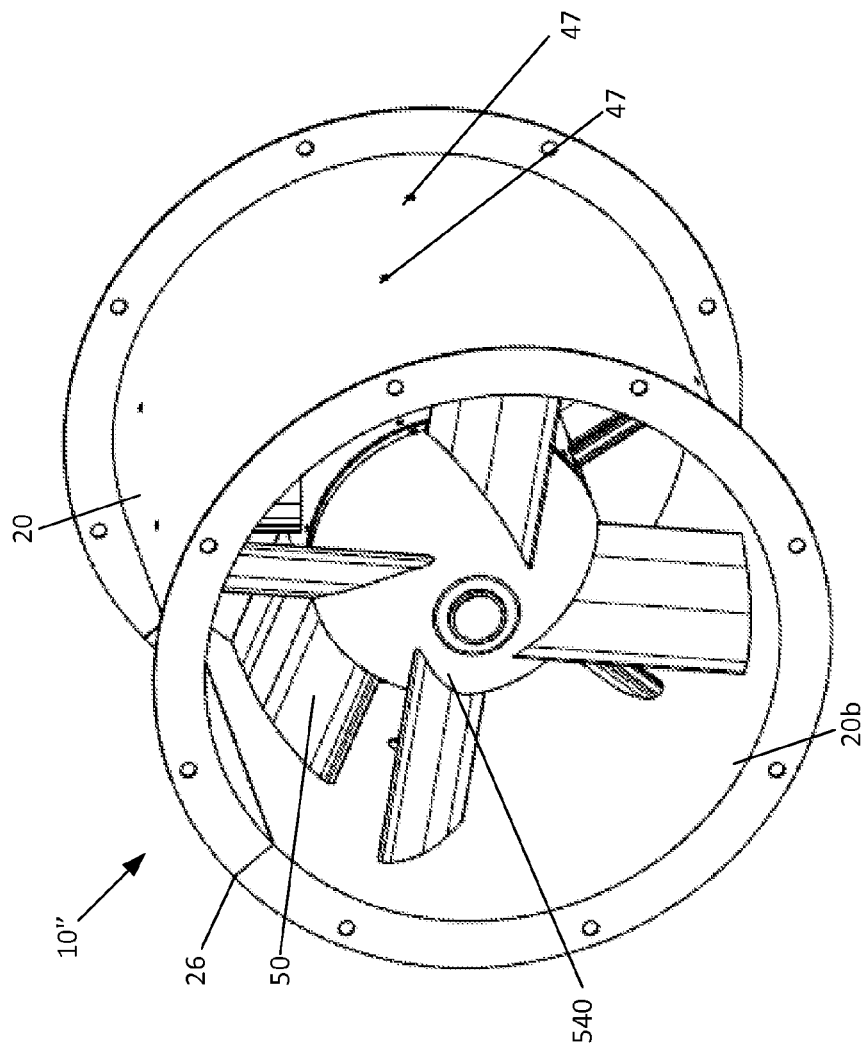
FIG. 41 is a perspective view of third embodiment of a fan assembly having features that are examples of aspects in accordance with the principles of the present disclosure.
Figure 43:
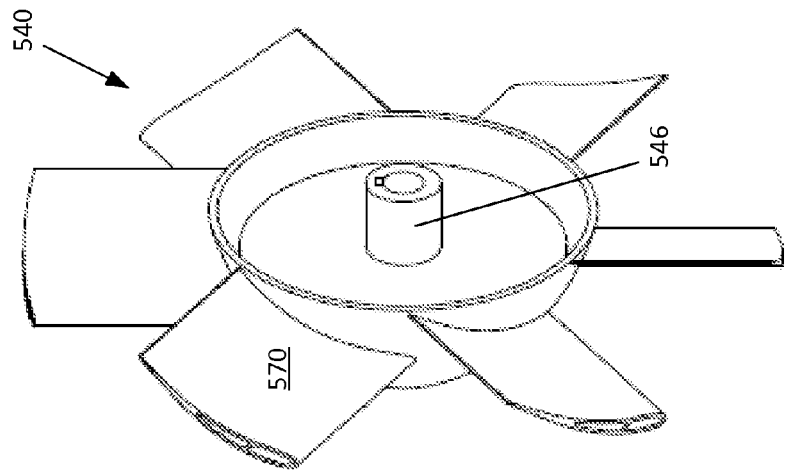
FIG. 43 is a rear perspective view of a fan wheel usable with the fan assembly shown in FIG. 41.
Figure 42:
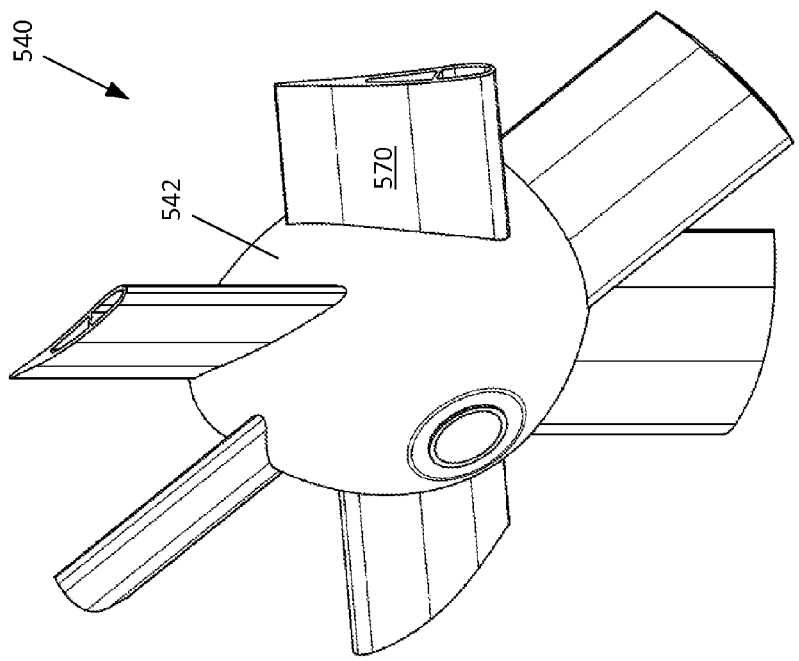
FIG. 42 is a front perspective view of a fan wheel usable with the fan assembly shown in FIG. 41.

Referring to FIGS. 40 and 41, a second embodiment 10' and third embodiment 10" of fan assemblies, respectively, are shown that include axial-flow type fan wheels instead of mixed-flow type fan wheels. The axial-flow fan wheels are discussed in further detail in the following sections. It is noted that both fan assemblies 10', 10" are shown as including the same general stator assembly 50 design that is shown for the first fan assembly embodiment 10. As many of the concepts and features are similar to the first stator assembly embodiment 50 shown in FIGS. 1 and 30-39, the applicable description for the embodiments of FIGS. 40-41 is hereby incorporated by reference for the second and third embodiments.

Referring to FIG. 40, an axial flow fan assembly 10' is provided in which a variable pitch axial fan wheel 440 is provided instead of a mixed flow type fan assembly 40. In this embodiment, a guide plate 59 is provided that is mountable to the stator assembly 50 to ensure that airflow is directed through the stator blades 80 instead of within the inner housing 54. As shown, the guide plate 59 is formed as a solid disk with a central opening 59a to allow the motor shaft 62 to pass through and connect to the central hub or connection mechanism 446. The guide plate 59 is also shown as including a plurality of openings 59b that are configured to align with the mounting holes 52a on the flange 52 such that the guide plate 59 can be secured by the same fasteners (or additional fasteners that are attached to the motor mounting plate) that secure the motor 60 to the stator 50. In the embodiment shown, guide plate 59 is formed from a galvanized material, although other materials may be used. Once installed, the guide plate 59 functions to block the majority of the airflow generated by the fan 440 through the central opening of the stator assembly inner housing 54. As such, the airflow stream generated by the fan wheel 40 is instead directed past the stator blades 80. Referring to FIG. 41, it is noted that the stator assembly 50 shown in FIG. 5 is provided with only five stator blades 80 rather than the thirteen blades shown in FIG. 40.

Axial Flow Fan Wheel Assemblies

As stated above, the axial fan assembly 10" shown in FIG. 41 includes an axial type fan assembly 540. The primary differences between fan wheels 40 and 540 are that the blades 570 are oriented such that an axial flow pattern can be achieved rather than a mixed flow pattern, and that the second end 573 of the blades 570 are free rather than being attached to a wheel cone. As many of the concepts and features are similar to the first to fourth embodiments shown in FIGS. 1-28, the description for the first to fourth embodiments, and all other embodiments presented herein relating to fan wheels, is hereby incorporated by reference for the sixth embodiment 540. Where like or similar features or elements are shown, corresponding or like reference numbers will be used where possible (e.g. 570 instead of 70).

Fan wheel 540 is similar to fan wheel 40 in that a dome-shaped base, such as a wheel hub 542, is utilized, and in that the same extruded aluminum profile for blade 70 can be used for the fan wheel blade 570. Thus, the description of the fan blade 570 will be limited to the differences in how the ends are cut.

Referring to FIGS. 42-56, the fan wheel assembly 540 is provided with a wheel hub 542 and six fan blades 570. It is noted that the fan assembly 10'" shown at FIG. 26 shows a fan wheel with four blades 570. Thus, it should be appreciated that fan assembly 40'" may be provided with any number of desired fan blades 570. Referring to FIGS. 35-38, an example fan blade 570 is shown in greater detail.

When a fan blade 570 is positioned and oriented as desired with respect to wheel back 42, a three-dimensional fan blade interface contour projection 548 can be defined on the outer surface 42a of the wheel hub 42. An example contour projection 48 for one of the blades 570 is shown at FIGS. 47-49. The fan blade orientation is defined by the rotation of the fan blade 570 about the blade's 570 longitudinal axis L3, transverse axis T3, and centerline axis Z3 with respect to the wheel back 542, shown at FIG. 35. The rotation of the blade about the longitudinal axis L'" operates to define an angle α4'", such as a blade pitch angle of about 45 degrees, as shown at FIG. 33 (or anywhere between 5 degrees to 45 degrees at the tip). In the embodiment shown, the blade 570 is also oriented such that the trailing edge 572 of the blade 570 is generally parallel to the base portion 42c" of the hub 542 such that the longitudinal axis L'" is generally orthogonal to the centerline X of the hub 542 and the fan assembly 542.

In order for the first end 573 of the blade 570 to be mounted flush to the hub outer surface 542a, meaning that generally no significant gaps are present between the blade material at the first end 573 and the hub outer surface 542a, the first end 573 must match the blade interface projection contour 548. As the blade 570 is formed from an extrusion, as opposed to being formed in a casting process, the first end 573 must be cut to match the projection contour 548. Where the outer surface 542a has a domed-shape and the blade first end 573 has a double-wall airfoil shape, as shown, the resulting cut required to match the projection contour 58 must be a compound cut that is curved in one direction and linear or straight in another direction. For example, FIG. 55-58 show a heavily curved cut from the leading edge 571 to the trailing edge 572 of the blade 570 and a generally linear cut from the top surface 575 to the bottom surface 576 to the blade 570.

The second end 574 of the blade 70 must also be cut in order to match the inside surface of the fan housing 20 with a small clearance, or at least be cut short enough to not touch the fan housing inner surface 20b. Accordingly, the blade second end 574 can be cut to match the radius of the fan housing inner surface 20b by implementing a compound cut that is curved in one direction and straight in another direction, as shown at FIGS. 53-56. In one embodiment, the second ends 574 of the blades 570 are cut such that a clearance of about 1 millimeter to about 3 millimeters results between the second ends 574 and the interior surface of the outer housing 20. As stated previously, in one embodiment, the housing 20 is welded at a seam line 26 by a plasma arc welding process which enables tight clearances between the fan blade ends 574 and the housing 20 because a very low degree of deformation in the roundness of the housing 20 occurs.

Once each blade 570 has been cut at the first and second ends 573, 574, the blades 570 can then be attached to the wheel hub 542. In one embodiment, the wheel hub 542 and blades 570 are metal, such as aluminum, and joined together by a welding process. Other materials and joining methods may be used without departing from the concepts presented herein.

Figure 51:
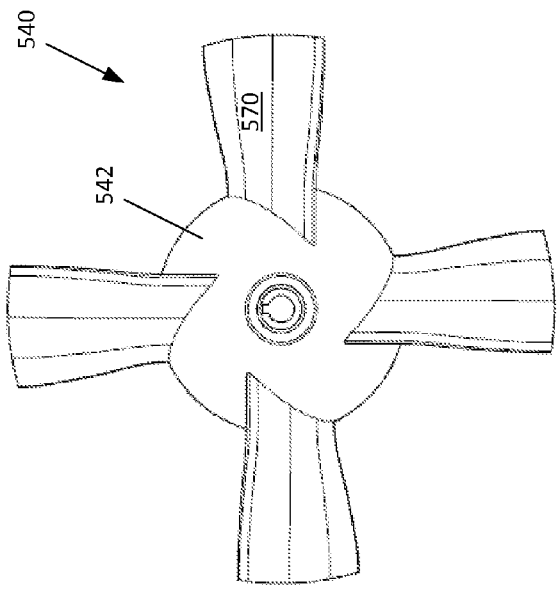
FIG. 51 is a top view of the fan wheel shown in FIG. 50.
Figure 52:
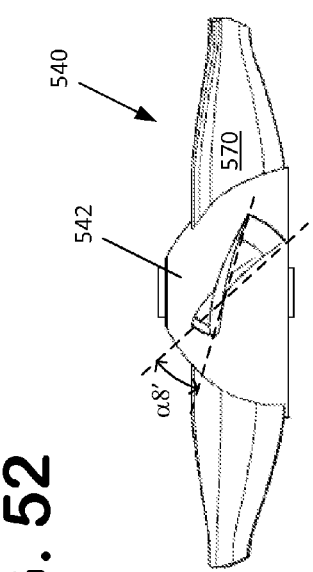
FIG. 52 is a side view of the fan wheel shown in FIG. 50.
Figure 50:
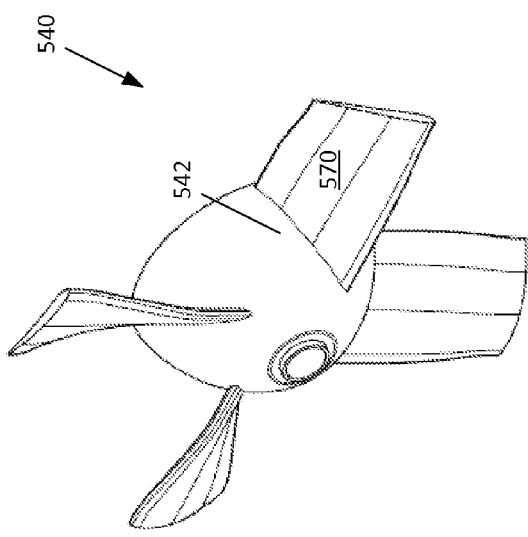
FIG. 50 is a perspective view of a second embodiment of an axial-flow fan wheel having features that are examples of aspects in accordance with the principles of the present disclosure.
Figure 54:
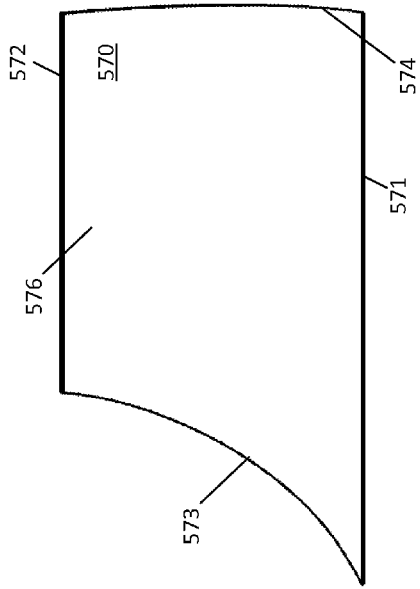
FIG. 54 is a bottom view of the fan blade shown in FIG. 53
Figure 56:
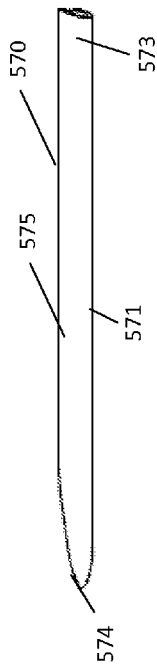
FIG. 56 is a rear view from the trailing edge of the fan blade shown in FIG. 53.
Figure 53:
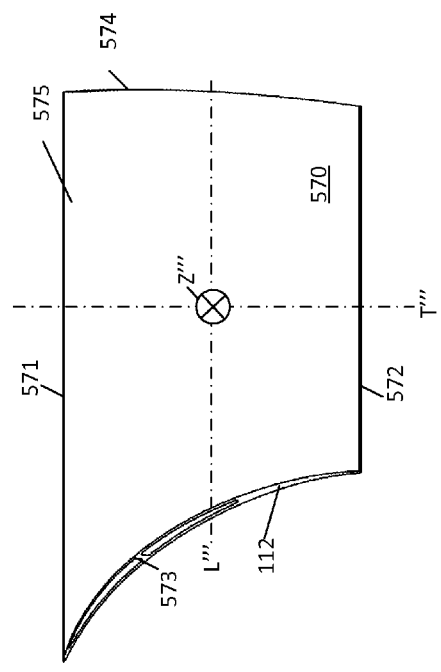
FIG. 53 is a top view of a fan blade usable with the fan wheels shown in FIGS. 41 and 50.
Figure 55:
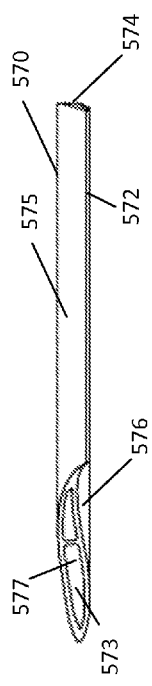
FIG. 55 is a front view from the leading edge of the fan blade shown in FIG. 53.

Referring to FIGS. 50-52, the blades 570 can be plastically deformed to achieve a desired twist angle, depending on the desired flow/speed combination required. Once twisted the blades 570 could be trimmed (using a milling machine or a fixture with a band saw) to the proper angle and length. It is noted that the blades could be trimmed in the same manner even if not twisted. The entire assembly can then be tempered, as described further in the next section. Referring to FIG. 52, the blades 570 are shown as being twisted about longitudinal axis L3 by an angle $\alpha 8'$. In one embodiment, the angle $\alpha 8'$ is from about 20 degrees to about 45 degrees. In one embodiment, the angle $\alpha 8'$ is about 30 degrees. It is noted that in the embodiment shown in FIGS. 50-52, the blades 570 are not provided with a taper or cut near their second ends 574. As is the case with the mixed-flow fan wheel with twisted blades, an increase in efficiency can be attained in the axial fan wheel 540 when the blades are deformed to have a twist.

Methods of Producing a Fan Wheel

Referring to FIG. 57-61, various processes are described for the creation of fan wheels, fan assemblies, and stator assemblies, as discussed in the following paragraphs. It is noted that although the figures diagrammatically show steps in a particular order, the described procedures are not necessarily intended to be limited to being performed in the shown order. Rather at least some of the shown steps may be performed in an overlapping manner, in a different order and/or simultaneously.

Referring to FIG. 57, a flow chart illustrating a process 1000 for creating a fan wheel and/or stator is shown. In a step 1002, a base, such as a fan wheel back or hub having a domed or conical shape, is provided. In a step 1004 a plurality of extruded aluminum double wall fan blades having at least one internal hollow cavity is provided. In one In a step 1006, a mounting position and orientation for each of the plurality of fan blades onto the hub or wheel back is determined. In a step 1008, a cutting profile for each of the fan blades corresponding to its mounting location and orientation on the base is determined. As stated above, the cutting profile can correspond to a blade projection interface contour with respect to the hub or wheel cone. In a step 1010, each of the blade ends is machine cut to produce the desired cutting profile. Subsequently, the blades are then mounted to the corresponding mounting location used to identify the blade projection interface contour at a step 1012. In a step 1014, each of the blades is plastically deformed to have a twist about the longitudinal axis of the blade. In one embodiment, the free ends of the blades are twisted about a longitudinal axis that is about 20 degrees to about 45 degrees with respect to the end attached to the hub or wheel back. In a step 1016, the free ends of each of the blades are cut while the hub or wheel back is rotated about a central axis. In one approach, the blades are cut with a cutting tool, such as a band saw, that is parallel to the central axis, such as can be the case with an axial-flow type fan wheel. In another approach, the cutting tool is at an angle to central axis such that the free ends are cut to match the angle of the wheel cone, such as may be the case with a mixed-flow type fan wheel. When the cutting tool is parallel to the central axis, step 1016 results in every part of the free end of each blade to have the same distance from the center axis of the hub or wheel back. Where a mixed-flow fan wheel is being produced, the free ends of the blades can be attached to a wheel cone at a step 1018, for example by welding. In a step 1020, the assembled fan wheel can be subjected to a tempering process, such as heating, cooling, hot working, cold working, naturally aging, artificially aging, stretching, and/or stretching to increase the strength of the material. In one embodiment, the components are subjected to a tempering process to result in a temper designation of T5 while in another embodiment, tempered to a T6 temper designation, for example to result in 6063-T5, 6063-T6, 60161-T5, or 6061-T6 aluminum.

Figure 58:
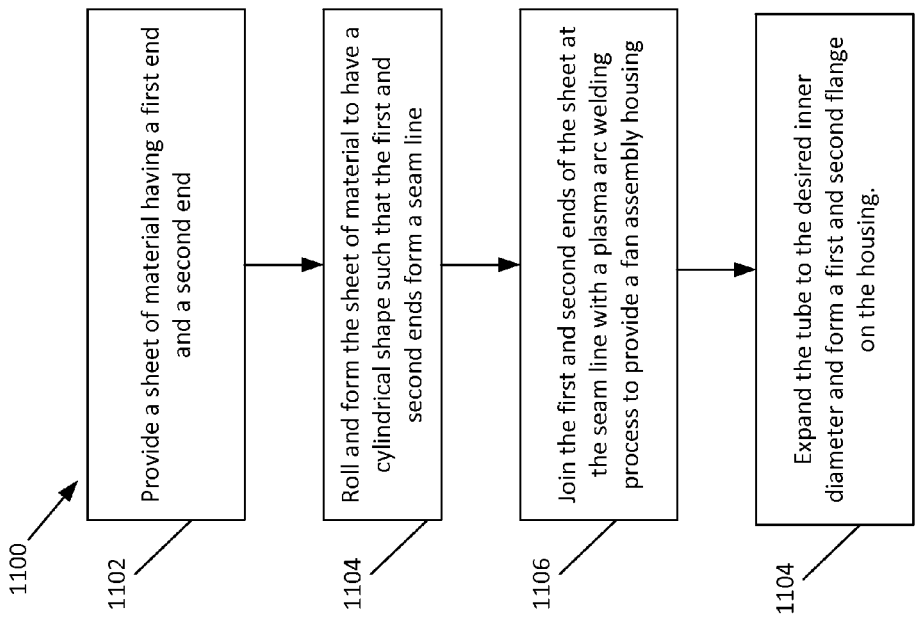
FIG. 58 is a flow chart showing a process for creating a fan assembly outer housing.

Referring to FIG. 58, a method 1100 is shown describing a process by which the housing 20 of the fan assembly may be produced. In a first step 1102, a sheet of material, such as an aluminum or steel sheet is provided wherein the sheet has a first end and a second opposite end. In a step 1104, the sheet of material is rolled to have a cylindrical shape between the flanges such that the first and second ends form a seam line. In a step 1106, the first and second ends of the sheet are joined at the seam line with a welding process, such as a plasma arc welding process to provide a fan assembly housing. Once the ends are joined to form a tube, a flange is added on one or both ends of the tube by expanding the tube to the desired inner diameter and forming the flanges on each end at step 1108.

Figure 59:
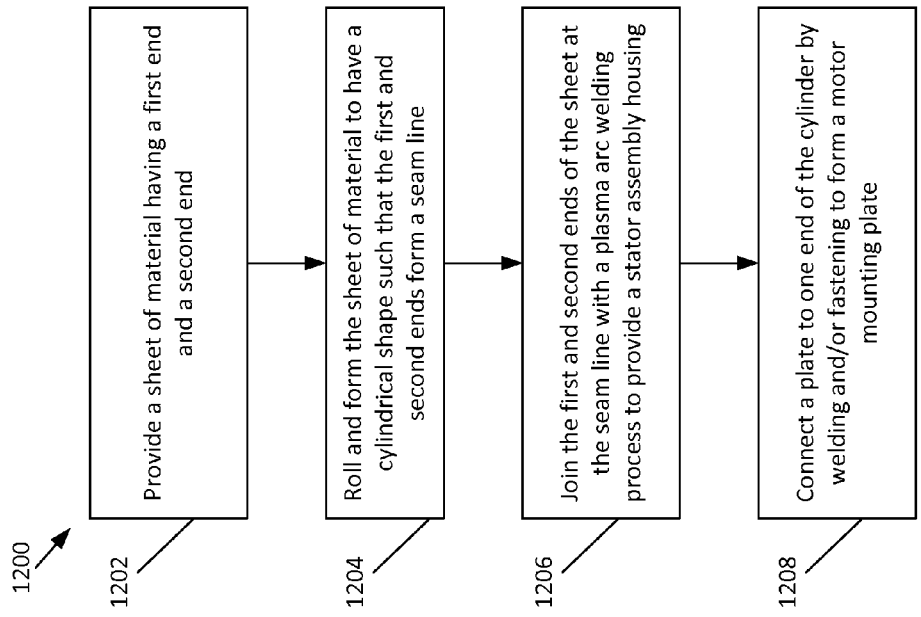
FIG. 59 is a flow chart showing a process for creating a fan assembly stator housing.

Referring to FIG. 59, a method 1200 is shown describing a process by which the inner housing 54 of the stator assembly 50 may be produced. In a first step 1202, a sheet of material, such as an aluminum or steel sheet is provided wherein the sheet has a first end and a second opposite end. In a step 1204, the sheet of material is rolled to have a cylindrical shape. In a step 1206, the first and second ends of the sheet are joined at the seam line with a welding process, such as a plasma arc welding process to provide a fan assembly housing. In step 1208 a plate is added to one end of the cylinder by welding or fastening (or a combination of the two) to create the motor mount plate.

Figure 60:
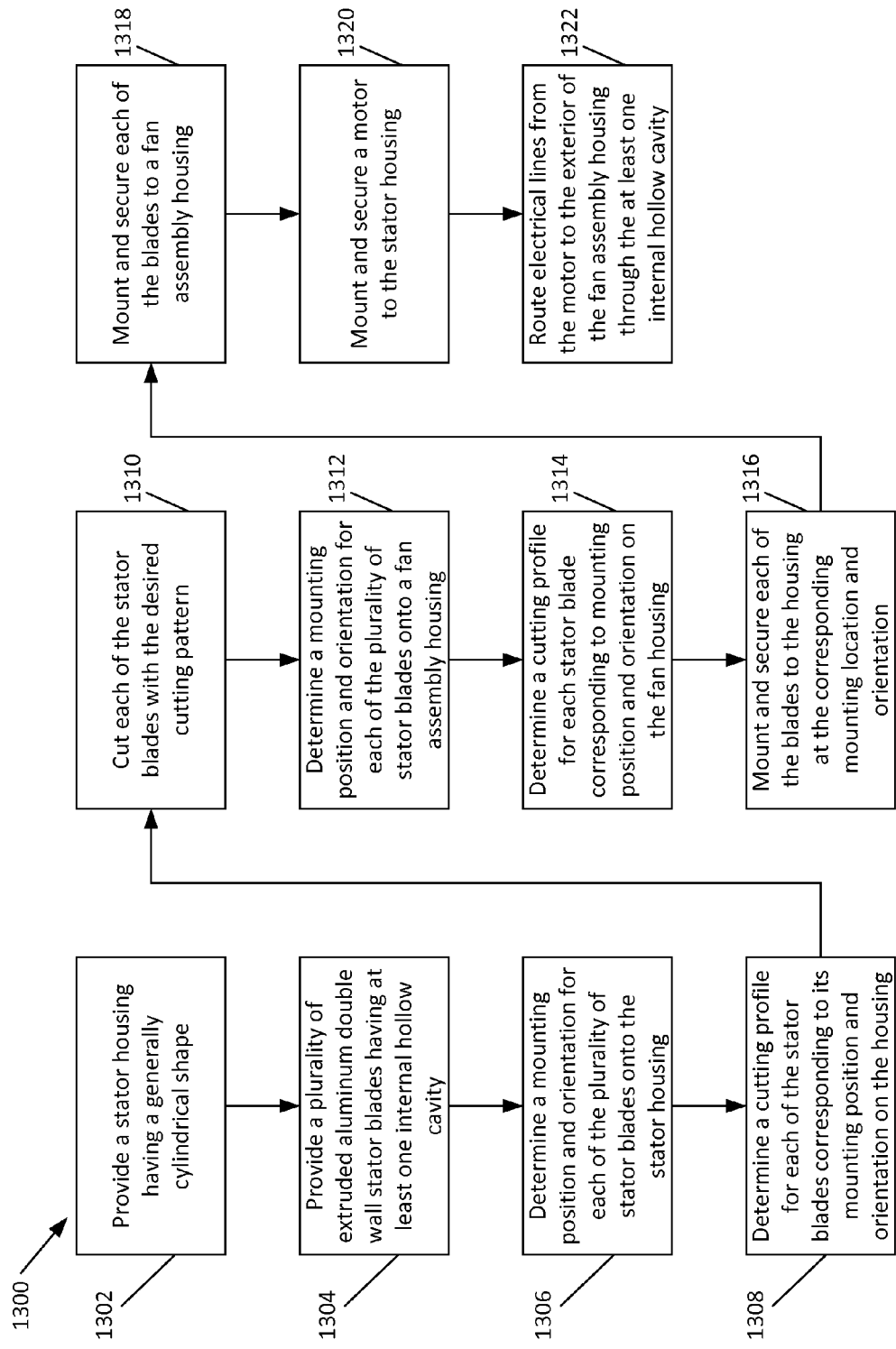
FIG. 60 is a flow chart showing a process for creating a stator assembly.

Referring to FIG. 60, a method 1300 is shown describing a process by which the stator assembly 50 may be produced. In a first step 1302, a stator housing having a generally cylindrical shape, such as the housing formed at process 1100, is provided. In a step 1304 a plurality of extruded aluminum double wall fan blades having at least one internal hollow cavity is provided. In a step 1306, a mounting position and orientation for each of the plurality of fan blades onto the stator housing is determined. In a step 1308, a cutting profile for each of the fan blades corresponding to its mounting location and orientation on the hub is determined. As stated above, the cutting profile can correspond to a blade projection interface contour with respect to the outer surface of the stator. In a step 1310, each of the blade ends is machine cut to produce the desired cutting profile. Steps 1312 and 1314 are similar to steps 1308 and 1310, except for that the opposite end of the stator blade is cut to match the inner surface of the fan assembly housing. Subsequently, the blades are then mounted to the corresponding mounting location used to identify the blade projection interface contour at a step 1316. In a step 1318, the blades are also secured to the fan assembly housing. As stated previously, the stator blades can be mounted to the stator housing and the fan assembly housing with mechanical fasteners that engage with anchor cavities 89 in the blades 80.

At step 1320, a motor may be mounted and secured to the stator assembly. At step 1322, electrical lines can be routed from the motor to the exterior of the fan assembly housing through at least one internal hollow cavity of one or more of the stator blades. As stated previously, the stator housing 54 may be provided with an aperture 54*c*, which may be made before or after step 1206 and the fan assembly housing 20 may be provided with an aperture 20*c*, which may be made before or after step 1106.

Referring to FIG. 61, a method 1400 is described for making mixed flow fan assembly having an inlet structure and a mixed-flow type fan wheel. In a step 1402, a mixed-flow fan wheel having fan blades with one free end and one opposite end mounted to a wheel back. In a step 1404, an inlet structure defining a bell inlet portion and a wheel cone portion is provided. In a step 1406, the fan wheel is mounted to a motor shaft disposed within a fan assembly housing while in a step 1408, the inlet structure is mounted to the fan assembly housing. In a step 1410, the wheel cone portion of the inlet structure is aligned with the fee ends of the fan blades along a common central axis of the inlet structure and the fan wheel. In a step 1412, the wheel cone is spaced from the free ends of the fan blades to achieve a predetermined axial distance along the central axis such that a gap is formed between the free ends and the interior surface of the wheel cone.

The above described fan assemblies, fan wheels, stator assemblies, and related methods have been determined, in some embodiments, to result in a 20% increase in operational efficiency while reducing manufacturing and material costs by up to 75%. Accordingly, the disclosure represents a significant improvement over the state of the art.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method of producing a stator assembly for a fan assembly comprising:
    (a) providing a cylindrical inner housing having an outer surface and a cylindrical outer housing having an inner surface;
    (b) providing an airfoil-shaped aluminum extrusion having at least one internal cavity extending between upper and lower surfaces and having at least one anchor cavity extending longitudinally in a direction parallel to a length of the stator blade and between the upper and lower surfaces;
    (c) cutting the aluminum extrusion into a plurality of stator blades;
    (d) defining a mounting orientation and position for each of the stator blades with respect to the outer surface of the inner housing and the inner surface of the outer housing;
    (e) machine cutting a first end of each of the stator blades with a cutting head of a cutting machine to have a profile with at least one concave curve extending in a direction from a leading edge to a trailing edge of the stator blade and with at least one linear path extending in a direction from a top surface to a bottom surface of the stator blade such that the stator blade first end can be flush mounted to the inner housing in the mounting orientation and position;
    (f) machine cutting a second end of each of the stator blades with a cutting head of a cutting machine to have a profile with at least one convex curve extending in a direction from a leading edge to a trailing edge of the stator blade and with at least one linear path extending in a direction from a top surface to a bottom surface of the stator blade such that the stator blade second end can be flush mounted to the outer housing in the mounting orientation and position; and
    (g) flush mounting each of the stator blades to the inner housing and the outer housing such that the inner housing and an electric motor are structurally supported by the stator blades such that curved side edges of the upper and lower surfaces contact the inner housing and outer housing;
    (h) securing each of the stator blades to the inner housing with a first plurality of mechanical fasteners, each of which extends into the stator blade anchor cavity at a first end of one of the stator blades, and securing each of the stator blades to the outer housing with a second plurality of mechanical fasteners, each of which extends into the stator blade anchor cavity at a second end of one of the stator blades.

2. The method of claim 1, further including the steps of providing the inner housing with a first aperture aligned with a first internal cavity of a first one of the stator blades and providing the outer housing with a second aperture aligned with the first one of the stator blades, wherein the first one of the stator blades is the same size as the remaining stator blades.

3. The method of claim 2, wherein the electric motor is provided with at least one electrical cable extending from the electrical motor through the first aperture, through the stator blade first internal cavity, and through the second aperture.

4. The method of claim 1, further including the step of providing the inner housing with a notch for accepting a portion of an electric drive motor.

5. The method of claim 1, wherein the step of cutting the extrusion into a plurality of stator blades includes forming between 4 and 20 stator blades.

\* \* \* \* \*